(12) United States Patent
Ohira et al.

(10) Patent No.: US 8,154,513 B2
(45) Date of Patent: Apr. 10, 2012

(54) DISPLAY SYSTEM AND METHOD FOR DETECTING POINTED POSITION

(75) Inventors: Masakazu Ohira, Nara (JP); Hitoshi Hirohata, Hashimoto (JP)

(73) Assignee: Sharp Kabushiki Kaisha, Osaka (JP)

( * ) Notice: Subject to any disclaimer, the term of this patent is extended or adjusted under 35 U.S.C. 154(b) by 763 days.

(21) Appl. No.: 12/248,481

(22) Filed: Oct. 9, 2008

(65) Prior Publication Data

US 2009/0096768 A1   Apr. 16, 2009

(30) Foreign Application Priority Data

Oct. 10, 2007   (JP) .................................. 2007-264899

(51) Int. Cl.
*G06F 3/033*   (2006.01)

(52) U.S. Cl. ........................ 345/157; 345/156; 348/135

(58) Field of Classification Search .......... 345/156–167, 345/182, 183; 348/135–142; 463/36–39
See application file for complete search history.

(56) References Cited

U.S. PATENT DOCUMENTS

| | | | | |
|---|---|---|---|---|
| 5,317,140 A * | 5/1994 | Dunthorn | ...................... | 250/221 |
| 5,926,238 A | 7/1999 | Inoue et al. | | |
| 6,373,961 B1 * | 4/2002 | Richardson et al. | .......... | 382/103 |
| 6,570,584 B1 * | 5/2003 | Cok et al. | ...................... | 345/690 |
| 8,077,146 B2 * | 12/2011 | Morimoto et al. | ............. | 345/158 |
| 2002/0067419 A1 * | 6/2002 | Inoue et al. | ............. | 348/333.03 |
| 2002/0163576 A1 * | 11/2002 | Ishino et al. | .................. | 348/136 |
| 2003/0032478 A1 | 2/2003 | Takahama et al. | | |
| 2004/0048663 A1 * | 3/2004 | Cheng et al. | .................... | 463/36 |
| 2006/0209013 A1 * | 9/2006 | Fengels | ........................ | 345/156 |
| 2006/0244693 A1 | 11/2006 | Yamaguchi et al. | | |
| 2007/0018915 A1 * | 1/2007 | Tang et al. | ....................... | 345/76 |
| 2007/0060391 A1 * | 3/2007 | Ikeda et al. | ..................... | 463/46 |
| 2008/0284724 A1 * | 11/2008 | Alten | ............................ | 345/156 |
| 2009/0033638 A1 | 2/2009 | Yamaguchi et al. | | |
| 2009/0054162 A1 * | 2/2009 | Utsuki et al. | .................... | 463/53 |

FOREIGN PATENT DOCUMENTS

| | | |
|---|---|---|
| JP | 6-308879 A | 11/1994 |
| JP | 6-342146 | 12/1994 |
| JP | 7-121293 A | 5/1995 |

(Continued)

OTHER PUBLICATIONS

T. Higashi, "DC Operating Metal-halide Lamp for LCD Projector", Optical Technology Magazine Light Edge No. 11, Oct. 1997, pp. 6-pp. 9.

(Continued)

*Primary Examiner* — Amare Mengistu
*Assistant Examiner* — Dmitriy Bolotin
(74) *Attorney, Agent, or Firm* — Birch, Stewart, Kolasch & Birch, LLP

(57) ABSTRACT

At least two infrared light-emitting areas are displayed within a display screen of a liquid crystal display apparatus. The infrared light-emitting areas are areas for emitting light having a wavelength in the infrared region. Then, an image is captured by an operating device in the direction of a position pointed by the operating device. A position on the display screen that is pointed by the operating device is calculated based on the positions of the infrared light-emitting areas that are included in the captured image. This arrangement makes it possible to appropriately calculate the position on the display screen that is pointed by the operating device, independently of the distance between the operating device and the display screen of the liquid crystal display apparatus.

14 Claims, 16 Drawing Sheets

| | FOREIGN PATENT DOCUMENTS | |
|---|---|---|
| JP | 8-71252 | 3/1996 |
| JP | 8-335136 A | 12/1996 |
| JP | 2002-298145 | 10/2002 |
| JP | 2003-58317 | 2/2003 |
| JP | 2006-301864 | 11/2006 |
| JP | 2007-66080 A | 3/2007 |
| JP | 2007-83024 A | 4/2007 |
| JP | 2007-86995 A | 4/2007 |

OTHER PUBLICATIONS

M. Shinohara, "Backlight to Realize LCD of Ultrahigh Brightness and High Color Reproducibility", All about Electronic Display with Illustrations, Oct. 30, 2006, pp. 92-pp. 95.

U.S. Office Action issued in co-pending U.S. Appl. No. 12/331,037 on Nov. 18, 2011.

* cited by examiner

POSITION THAT IS POINTED
BY OPERATING DEVICE

CENTER OF CAPTURED IMAGE(0,0)

COORDINATE SYSTEM
OF DISPLAY SCREEN

COORDINATE SYSTEM
OF CAPTURED IMAGE

FIG. 15

| Distance Between Light-Emitting Areas In Captured Image / Current Distance Between Light-Emitting Areas On Display Screen | $W_{I1}$ | $W_{I2}$ | $W_{I3}$ |
|---|---|---|---|
| $W_{c1}$ | $Wn_{11}$ | $W_{n21}$ | $W_{n31}$ |
| $W_{c2}$ | $W_{n12}$ | $W_{n22}$ | $W_{n32}$ |
| $W_{c3}$ | $W_{n13}$ | $W_{n23}$ | $W_{n33}$ |

DISPLAY SYSTEM AND METHOD FOR DETECTING POINTED POSITION

This Nonprovisional application claims priority under 35 U.S.C. §119(a) on Patent Application No. 264899/2007 filed in Japan on Oct. 10, 2007, the entire contents of which are hereby incorporated by reference.

FIELD OF THE INVENTION

The present invention relates to (i) a display system that can detect a position on a display screen that is pointed by an operating device such as a pointer (hereinafter, such a position is also referred to as pointed position) and (ii) a method for detecting the pointed position.

BACKGROUND OF THE INVENTION

Recently, display apparatuses, such as liquid crystal displays and plasma displays, have been developed to be slimmed down. Also, display apparatuses with a larger-size screen have been recently become widely used.

A large-size flat panel display apparatus can be used in, for example, a presentation made at a conference or made in a product introduction, or used as a display apparatus for a video game. In such uses, a target point (i.e., a position) on an image displayed on a display screen is pointed by an operating device such as a pointer so that an operation is conducted.

For example, Patent Document 1 (Japanese Unexamined Patent Publication No. 2007-66080 (Tokukai 2007-66080, publication date: Mar. 15, 2007)) discloses an art for detecting coordinates of a pointed point on a display screen. In the art, (i) light emitting devices provided on front and rear surfaces of a pointer are driven based on respective different blinking patterns, (ii) an image, including light-emitting areas on the front and rear surfaces of the pointer, is captured by cameras provided on either side of the display screen, respectively, and (iii) directions (angles) in which the light-emitting areas exist and distances between the cameras and the light-emitting areas, respectively, are subjected to an arithmetical operation and are analyzed based on the trigonometry so that the coordinates of the pointed point on a display screen is detected.

Furthermore, Patent Document 2 (Japanese Unexamined Patent Publication No. 2007-83024 (Tokukai 2007-83024, publication date: Apr. 5, 2007)) discloses a system that detects coordinates of a position on a display screen. In the system, (i) a module with an LED that emits infrared light is provided in the vicinity of a display screen, for example, at an upper part or a lower part on a display apparatus, (ii) an image of the LED is captured by use of a filter that allows only infrared light to pass through and an image sensing device such as a CMOS sensor or a CCD image sensor, which filter and image sensing device are provided in a controller, and (iii) the coordinates of a position on the display screen are detected based on a positional change of the LED in the data of the image thus captured.

According to the conventional arts, unfortunately, a position pointed by the operating device may not be properly detected in a case where the operating device is positioned close to the display apparatus.

That is, according to the art disclosed in Patent Document 1, the display apparatus has, on either side of its display screen, the cameras for capturing an image including the light-emitting areas that are provided on the front and rear surfaces of the pointer (an operating device). As such, the positions of the light-emitting areas can be outside a range in which the camera can capture an image, in a case where the pointer is positioned close to the display screen.

As for the art disclosed in Patent Document 2, the LED module, provided at the upper or lower part on the display screen of the display apparatus, emits infrared light and the infrared light is captured by the image sensing device in the controller (an operating device). As in the case of Patent Document 1, the LED module can be outside a range in which the image sensing device can capture an image, in a case where the controller is positioned close to the display screen.

FIGS. 18(a), 18(b), 19(a), and 19(b) are explanatory views each illustrating a relation, in the case of the same arrangement as that disclosed in Paten Document 2, between (i) a distance between an operating device 101 and a display apparatus 102, and (ii) a range in which a position that is pointed by the operating device 101 can be detected.

In a case where the display apparatus 102 and the operating device 101 are away enough from each other as illustrated in FIGS. 18(a) and 18(b), it is possible to detect a position that is pointed by the operating device 101. This is because an LED module 103 is within a range in which an image sensing device in the operating device 101 can capture an image, irrespective of a position, on a display screen, pointed by the operating device 101.

In contrast, in a case where the display apparatus 102 and the operating device 101 are positioned close to each other as illustrated in FIGS. 19(a) and 19(b), the LED module 103 cannot be within the range in which the image sensing device can an image, depending on a position pointed by the operating device 101. In this case, it is impossible to detect the position pointed by the operating device 101.

SUMMARY OF THE INVENTION

In view of the problem, the present invention is made, and an object of the present invention is to properly detect, even in a case where an operating device and a display apparatus are positioned close to each other, a position on the display screen that is pointed by the operating device.

In order to attain the object, a display system of the present invention includes: a display apparatus including a display screen on which an image is displayed in accordance with image data; an operating device for pointing, not in contact with the display screen, a position on the display screen, and for capturing an image including the position pointed; and at least two infrared light-emitting areas, in the display apparatus, for emitting light having a wavelength in an infrared region, said system detecting, based on positions of said at least two infrared light-emitting areas included in an image that is captured by the operating device, the position on the display screen pointed by the operating device, and at least one of said at least two infrared light-emitting areas being provided within the display screen of the display apparatus.

According to the arrangement, at least one infrared light-emitting area for emitting light having a wavelength in the infrared region is provided within a display screen. As compared with an arrangement in which an infrared light-emitting area is provided as conventionally only outside a display screen, this arrangement allows a reduction in a distance between a display apparatus and an operating device that distance is required for including in a range in which an image can be captured the two or more infrared light-emitting areas. Accordingly, this allows a reduction in a distance between the display screen and the operating device that distance is required for properly calculating a position, on the display screen, pointed by the operating device. As a result, the position, on the display screen, pointed by the operating device can be properly detected even in a case where the distance between the operating device and the display apparatus is short.

In order to attain the object, a method, of the present invention, for detecting a pointed position in a display system, said display system comprising: a display apparatus including a display screen on which an image is displayed in accordance with image data; an operating device for pointing, not in contact with the display screen, a position on the display screen, and for capturing an image including the position pointed; and at least two infrared light-emitting areas, in the display apparatus, for emitting light having a wavelength in an infrared region, said system detecting, based on positions of said at least two infrared light-emitting areas included in an image that is captured by the operating device, the position on the display screen pointed by the operating device, said method includes the step of: providing at least one of said at least two infrared light-emitting areas within the display screen of the display apparatus.

According to the method, at least one infrared light-emitting area for emitting light having a wavelength in the infrared region is provided within a display screen. As compared with an case where an infrared light-emitting area is provided as conventionally only outside a display screen, this arrangement allows a reduction in a distance between a display apparatus and an operating device that distance is required for including in a range in which an image can be captured the two or more infrared light-emitting areas. Accordingly, this allows a reduction in a distance between the display screen and the operating device that distance is required for properly calculating a position, on the display screen, pointed by the operating device. As a result, the position, on the display screen, pointed by the operating device can be properly detected even in a case where the distance between the operating device and the display apparatus is short.

Additional objects, features, and strengths of the present invention will be made clear by the description below. Further, the advantages of the present invention will be evident from the following explanation in reference to the drawings.

BRIEF DESCRIPTION OF THE DRAWINGS

FIG. 15 is an explanatory view illustrating one example of a lookup table that is stored in a memory section provided in a display apparatus of the display system of the another embodiment of the present invention.

DESCRIPTION OF THE EMBODIMENTS

[First Embodiment]

The following description deals with one embodiment of the present invention.

Figure 2:
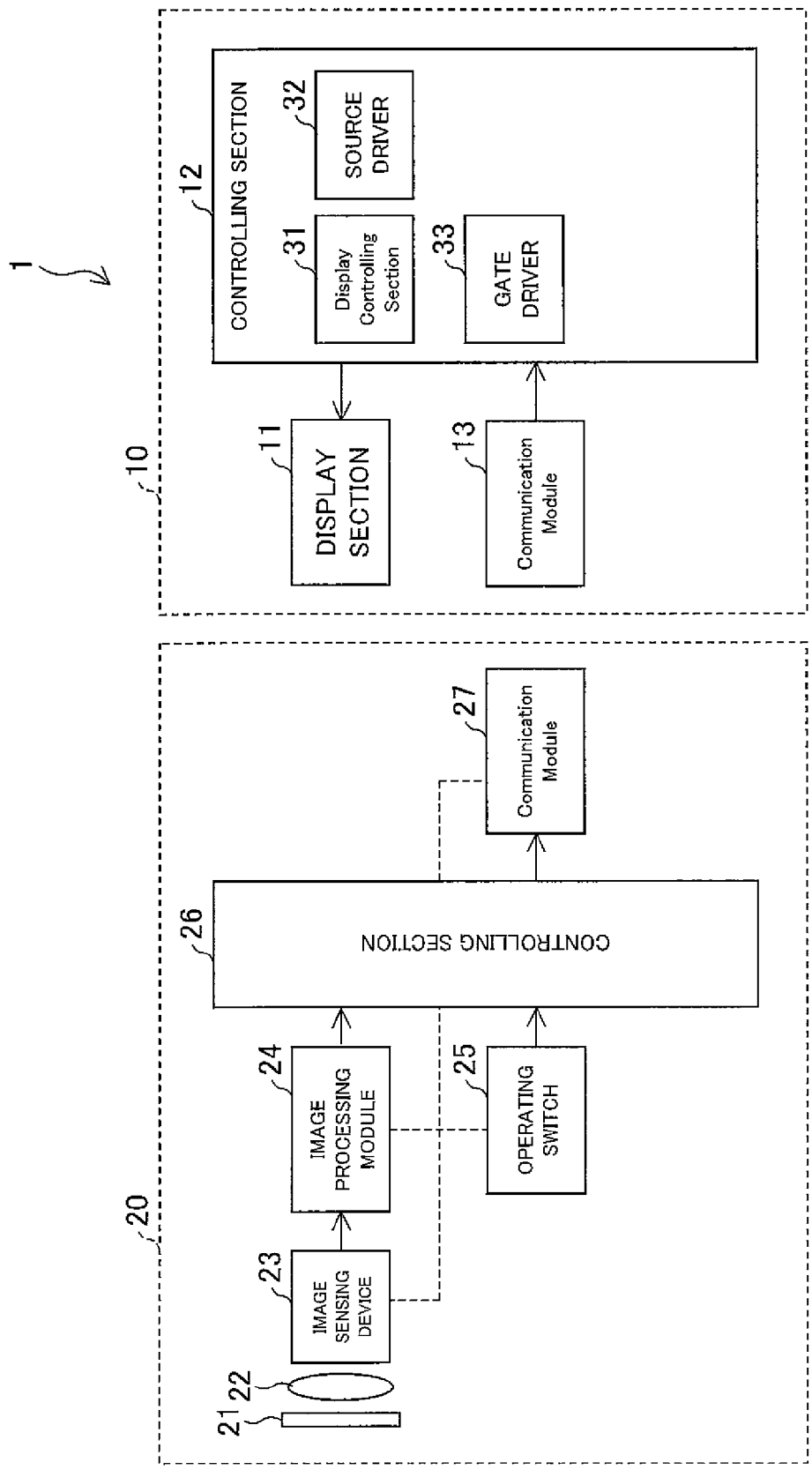
FIG. 2 is a block diagram illustrating a schematic arrangement of a display system of the one embodiment of the present invention.

FIG. 2 is a block diagram illustrating a schematic arrangement of a display system 1 of the present embodiment. As illustrated in FIG. 2, the display system 1 includes a liquid crystal display apparatus 10 and an operating device 20.

The liquid crystal display apparatus 10 includes a display section 11, a controlling section 12, and a communication module 13.

Figure 3:
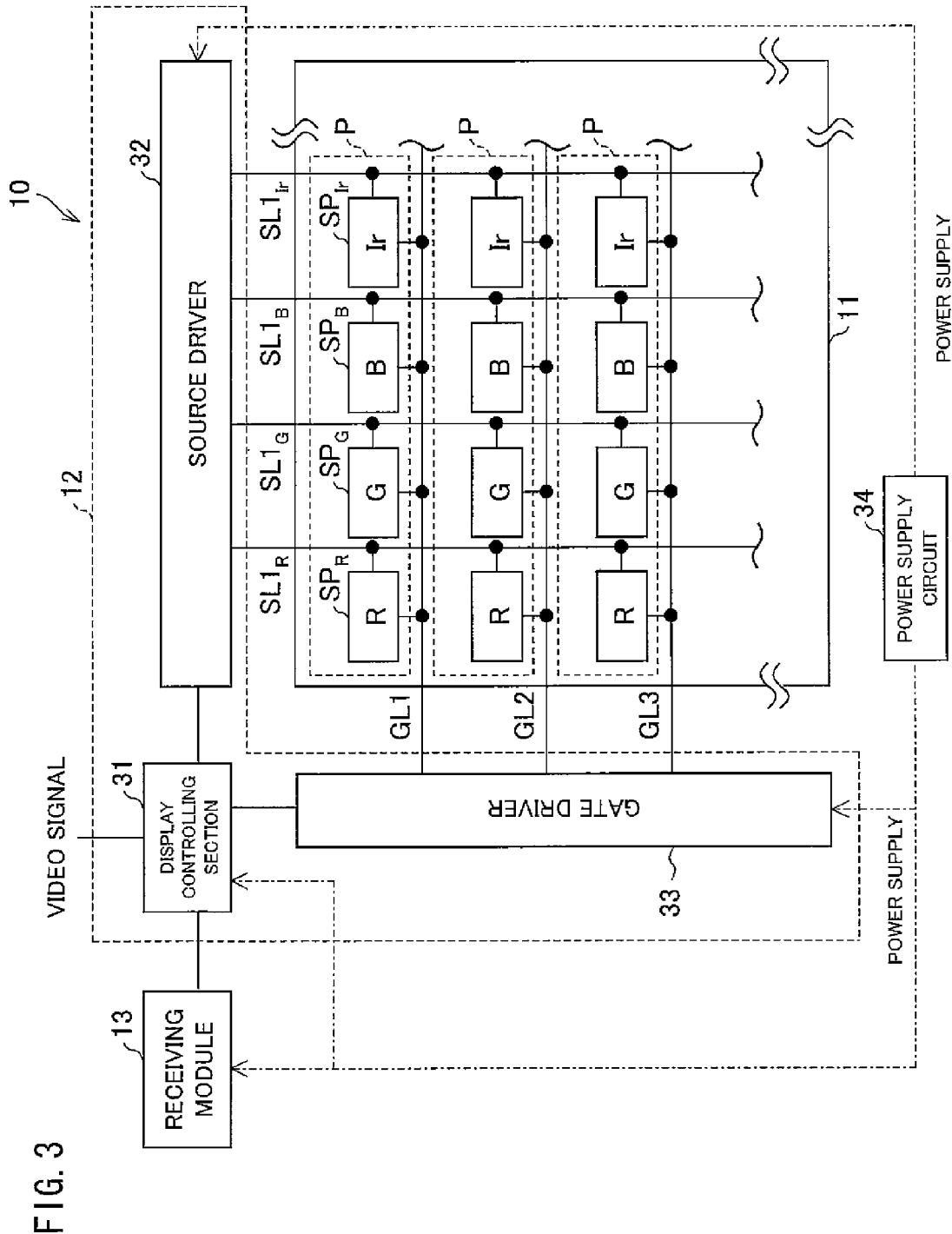
FIG. 3 is a block diagram illustrating a schematic arrangement of the display apparatus of the one embodiment of the present invention.
Figure 4:
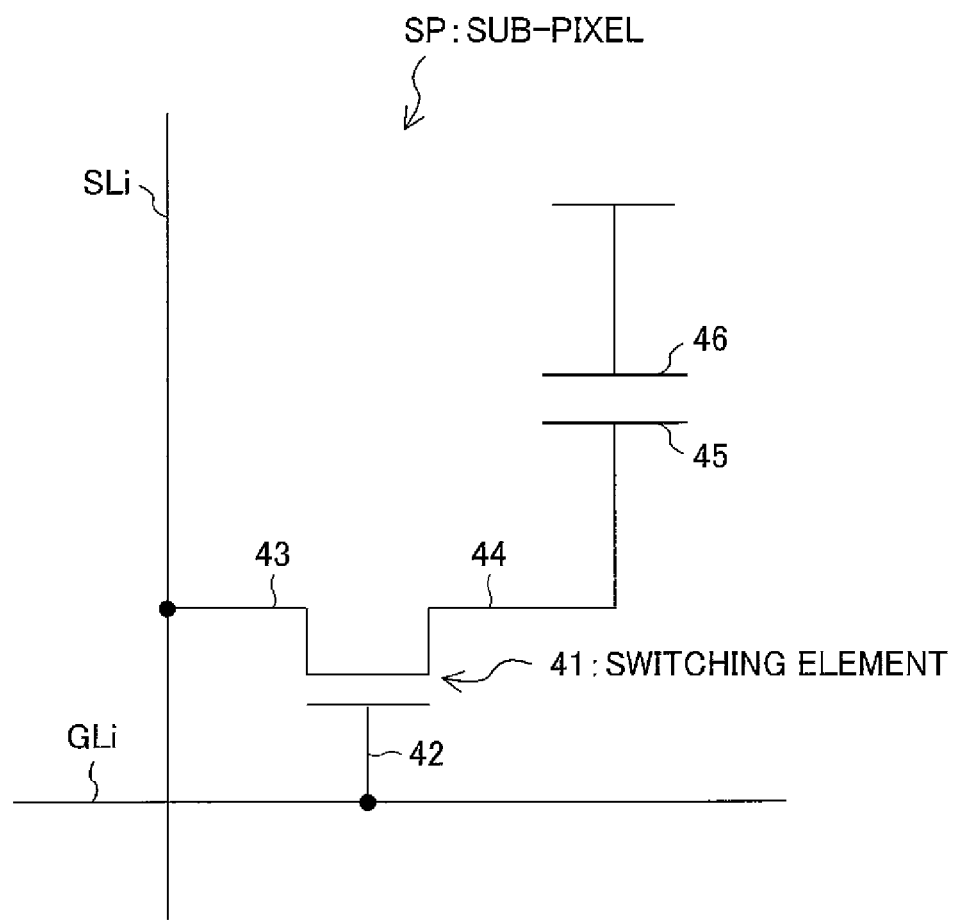
FIG. 4 is a schematic view illustrating a schematic arrangement of each of sub-pixels that are provided in the display section of the display apparatus of the one embodiment of the present invention.

FIG. 3 is a block diagram illustrating a schematic arrangement of the liquid crystal display apparatus 10. FIG. 4 is a schematic view illustrating a schematic arrangement of each of sub-pixels of the liquid crystal display apparatus 10 that is illustrated in FIG. 3.

As illustrated in FIG. 3, the liquid crystal display apparatus 10 includes (i) the display section (a display panel) 11 in which many pixels P are provided in a matrix manner, (ii) the controlling section 12 including a source driver 32, a gate driver 33, and a display controlling section 31, (iii) the communication module 13 that transmits and receives data to/from the operating device 20, and (iv) a power supply circuit 34 for supplying power to these circuit elements. Each of the pixels P includes sub-pixels: SPR, SPG, SPB, and SPIr, which correspond to the four colors: R (red), G (green), B (blue), and Ir (infrared), respectively. Note that the present embodiment is not limited to the arrangement in which the pixels are provided in a matrix manner, provided that each of the many pixels can be properly driven. For example, the pixels P can be regularly arranged in accordance with a rule that is different from that of the matrix.

The display section 11 includes a plurality of data signal lines $SL1_R$, $SL1_G$, $SL1_B$, $SL1_{Ir}$ through $SLn_R$, $SLn_G$, $SLn_B$, $SLn_{Ir}$ ("n" represents any integer that is two or more), a plurality of scanning signal lines GL1 through GLm ("m" represents any integer that is two or more), which intersect with the plurality of data signal lines. Note that a sub-pixel is provided for every combination of a data signal line and a scanning signal line.

The display controlling section 31 controls the intensity of light passing through each of the sub-pixels by controlling the source driver 32 and the gate driver 33. This causes an image to be displayed on the display section 11 in accordance with display image data. The display image data can be, for example, the one which is supplied from an external device (not shown) that is connected to the liquid crystal display apparatus 10 so that the external device and the liquid crystal display apparatus 10 can communicate with each other. Alternatively, the display image data can be the one that is supplied from a memory section (not shown) provided in the liquid crystal display apparatus 10. Alternatively, the display image data may be broadcast data that is received via receiving means (not shown) such as an antenna or a tuner.

Based on information supplied from the operating device 20 via the communication module 13, the display controlling section 31 also calculates a position, on a display screen of the display section 11, that is pointed by the operating device 20. The display controlling section 31 controls the source driver 32 and the gate driver 33 so as to cause the display section 11 to display a predetermined image (image such as a mark indicating a pointed position) at the position on the display screen that is pointed by the operating device 20. Details of how the position is calculated are described later.

In accordance with display image data, the source driver 32 generates driving voltages for driving the sub-pixels. Then, the driving voltages are applied to the data signal lines corresponding to the sub-pixels, respectively. The gate driver 33 controls voltages applied to the scanning signal lines so that the driving voltages supplied from the source driver 32 are sequentially supplied at predetermined timing to the sub-pixels, which are aligned along the data signal lines, respectively. The source driver 32 and the gate driver 33 can be realized by conventional ones.

As illustrated in FIG. 4, each of the sub-pixels includes a switching element 41. An FET (a field-effect transistor) or a TFT (a thin-film transistor) is, for example, used as the switching element 41. A gate electrode 42 of the switching element 41 is connected to a scanning signal line GLi ("i" is any integer that is one or more); a source electrode 43 of the switching element 41 is connected to a data signal line; a drain electrode 44 of the switching element 41 is connected to a sub-pixel electrode 45. A counter electrode 46, provided so as to face the sub-pixel electrode 45, is connected to a common electrode line (not shown) that is shared among all the sub-pixels.

Figure 1:
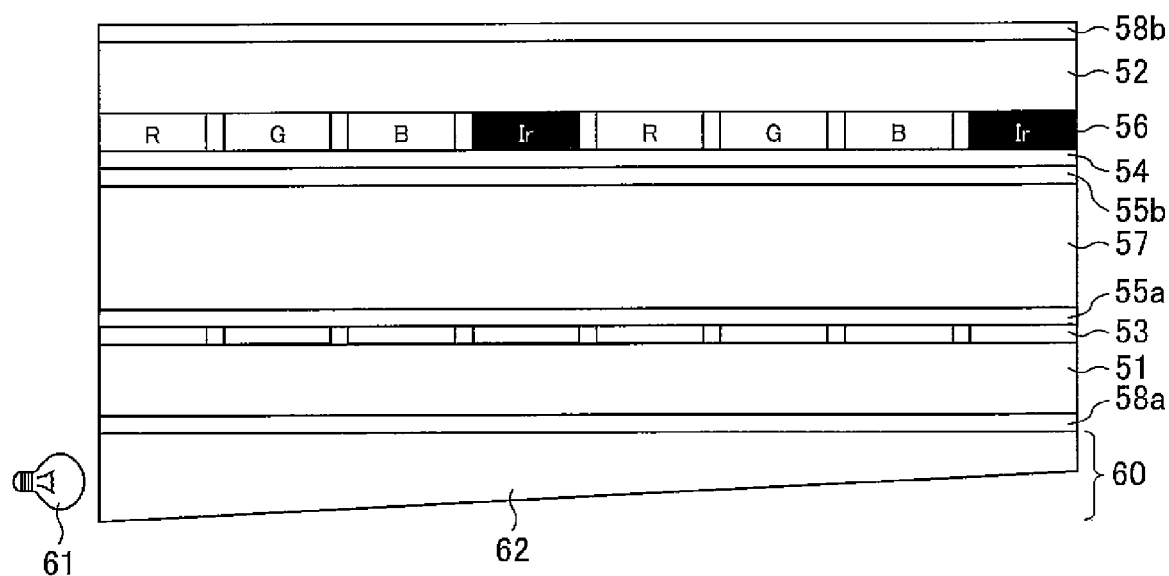
FIG. 1 is a cross-sectional view illustrating a display section that is provided in a display apparatus of one embodiment of the present invention.

FIG. 1 is a cross-sectional view illustrating the display section 11. As illustrated in FIG. 1, the display section 11 includes glass substrates 51 and 52, and a liquid crystal layer 57 made of a liquid crystalline material that is sealed in between the glass substrates 51 and 52. The glass substrates 51 and 52 are provided so as to face each other and to keep a predetermined space, using a spacer (not shown). Used as the liquid crystalline material is a commonly used liquid crystal material such as nematic liquid crystal, smectic liquid crystal, or ferroelectric liquid crystal.

Provided on a surface of the glass substrate 51 that faces the glass substrate 52 are (i) a wiring layer 53 including the data signal liens $SL1_R$, $SL1_G$, $SL1_B$, $SL1_{Ir}$ . . . , the scanning signal lines GL1, . . . , the switching elements 41, the sub-pixel electrodes 45 and (ii) an alignment film 55a formed so as to cover the wiring layer 53. In addition, a polarization plate 58a is provided on a surface opposite to the surface of the glass substrate 51 that faces the glass substrate 52. A backlight unit 60 is provided so as to face the polarization plate 58a.

A color filter layer 56, the counter electrode 46 made of a transparent conductive film, and an alignment film 55b formed so as to cover the counter electrode 46 are formed, in this order, on a surface of the glass substrate 52 that faces the glass substrate 51. A polarization plate 58b is provided on a surface opposite to the surface of the glass substrate 52 that faces the glass substrate 51.

Based on a type of the liquid crystalline substance that is sealed in the liquid crystal layer 57 and other factors, it is possible to set (i) a direction in which the alignment layers 55a and 55b are aligned and (ii) directions of absorption axes of the polarization plates 58a and 58b in the same way as a conventional liquid crystal display apparatus. In the present embodiment, the sub-pixel electrode 45 and the counter electrode 46 are provided on different substrates. However, the present invention is not limited to this. Alternatively, it is possible to adopt the so-called IPS method so that the sub-pixel electrode 45 and the counter electrode 46 are provided on a single substrate.

In the color filter layer 56, a filter for (i) allowing light, having a wavelength corresponding to any one of R, G, B, and Ir, to pass through and (ii) blocking light having other wavelengths is provided for each of the sub-pixels. An infrared-transmitting visible-absorbing filter of colored glass filters produced by HOYA Corporation can be used as a filter for allowing the Ir light (i.e., light having a wavelength in the infrared region) to pass through.

As illustrated in FIG. 1, the backlight unit 60 includes a light source 61 and a reflecting section 62. The reflecting section 62 reflects light emitted from the light source 61 so that the light is directed toward the display section 11. It is also possible to provide, between the backlight unit 60 and the display section 11, a diffusing film for diffusing the light emitted from the light source 61 so that an entire display surface of the display section 11 is uniformly irradiated with the diffused light.

Examples used as the light source 61 include a light source having a luminescence spectrum in both the visible region and the infrared region. Examples of such a light source include a metal halide lamp (e.g., Non-patent Document 1 (Tadatoshi Azuma, "DC-Operated Metal Halide Lamp for Liquid-Crystal Projector," LIGHT EDGE, No. 11, October 1997, pp. 6-9)). A light source having a luminescence wavelength in the visible region and a light source having a luminescence wavelength in the infrared region can be used in combination. For example, a white LED and an infrared LED can be used in combination. In this case, light emitted from the LEDs can be directed toward the display section 11 using a microlens array (e.g., Non-Patent Document 2 (Editorial supervisor: Tatsuo Uchida, "Illustrated: All about Electronic Display," Kogyo Chosakai Publishing, Inc, Oct. 30, 2006, pp. 92-95)).

With the arrangement, the liquid crystal display apparatus 10 controls a voltage to be applied between the sub-pixel electrode 45 and the counter electrode 46 of each of the sub-pixels so as to control an intensity of light that passes through each of sub-pixel regions in the liquid crystal layer 57. This allows (i) a color image display to be carried out and (ii) a light-emitting area (an infrared light-emitting area) to be displayed in any display position. The light-emitting area emits light which has a wavelength in the infrared region and cannot be perceived by a human eye, by causing the infrared light to pass through any one of the sub-pixels.

In the liquid crystal display apparatus 10 thus arranged, the switching elements 41 of the sub-pixels which are connected to a scanning signal line GLi are turned on when the scanning signal line GLi is selected. A signal voltage, which is determined in accordance with display image data supplied to the display controlling section 31, is applied between a sub-pixel electrode 45 and a counter electrode 46 by the source driver 32, via a data signal line. The voltage, obtained when the switching element 41 is turned off, is ideally maintained between the sub-pixel electrode 45 and the counter electrode 46, while the switching element 41 is turned off after the selecting period of the scanning signal line GLi. This causes a driving voltage to be independently applied between a sub-pixel electrode 45 and a counter electrode 46 in each of the sub-pixels. It follows that an electric field is applied, in accordance with an image to be displayed, to a sub-pixel region of the liquid crystal layer which is sandwiched by the sub-pixel electrode 45 and the counter electrode 46. This causes a change in an alignment state of liquid crystal molecules in the sub-pixel region. And the image is displayed.

As illustrated in FIG. 2, the operating device 20 includes an infrared-transmitting filter 21, a lens 22, an image sensing device 23, an image processing module 24, an operating switch 25, a controlling section 26, and a communication module 27. The operating device 20 is arranged so as to point any position on a display screen, by pointing a head part of the operating device 20 toward the liquid crystal display apparatus 10.

The infrared-transmitting filter 21 is a filter that allows light having a wavelength in the infrared region to pass through. Examples to be used as the infrared-transmitting filter 21 include the infrared-transmitting visible-absorbing filter of the colored glass filters produced by HOYA Corporation.

Infrared light passes through the infrared-transmitting filter 21 and is then converged by the lens 22 onto an image capturing section of the image sensing device 23. The image sensing device 23 is made of, for example, a CMOS or a CCD. The image sensing device 23 receives the infrared light converged by the lens 22 so as to capture an image. The image sensing device 23 then outputs an image signal of the captured image to the image processing module 24. The direction in which the image is captured by the image sensing device 23 (i.e., the optical axis of the lens 22) is parallel to the pointing direction of the operating device 20 (i.e., the direction in which a straight line extends between a position on the display screen that is pointed by the operating device 20 and the head part of the operating device 20).

Figure 5:
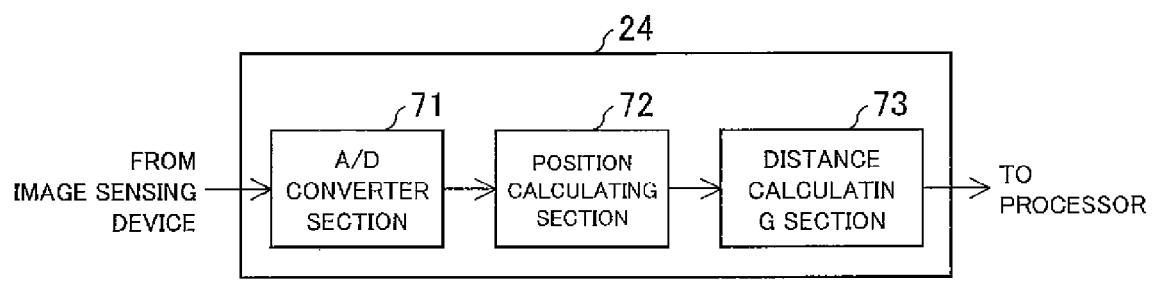
FIG. 5 is a block diagram illustrating an arrangement of an image processing module that is provided in an operating device of the one embodiment of the present invention.

As illustrated in FIG. 5, the image processing module 24 includes an A/D converter section 71, a position calculating section 72 for calculating a position of a light-emitting area, and a distance calculating section 73 for calculating a distance between light-emitting areas. The A/D converter section 71 carries out an AD-conversion with respect to image data supplied from the image sensing device 23 so as to generate a digital image signal. Based on the digital image signal, which is supplied from the A/D converter section 72, the position calculating section 72 calculates a relative position of a light-emitting area (infrared light-emitting area) and the center of a captured image, i.e., a relative position, in the coordinate system of a captured image, of a light-emitting area and the center of the captured image. The distance calculating section 73 calculates a distance between light-emitting areas in an image that is captured (i.e., a distance between light-emitting areas in the coordinate system of a captured image). Methods for calculating the position of the light-emitting areas and for calculating the distance between the light-emitting areas are described later.

The operating switch 25 accepts an instruction entered by a user. The operating switch 25 includes many buttons, keys, and the like.

The controlling section 26 controls operations of the sections in the operating device 20. The controlling section 26 generates information to be transmitted to the liquid crystal display apparatus 10, based on (i) calculated results of a pointed position and the distance between the light-emitting areas, which results are supplied from the image processing module 24, (ii) information entered by a user from the operating switch 25, and the like.

The communication module 27 transmits/receives data to/from the communication module 13, respectively, in the liquid crystal display apparatus 10. For example, the communication module 27 transmits information, supplied from the controlling section 26, to the liquid crystal display apparatus 10. A communication medium used by the communication module 27 is not particularly limited. Such a communication medium can be, for example, a wireless or wired communication medium.

Figure 6:
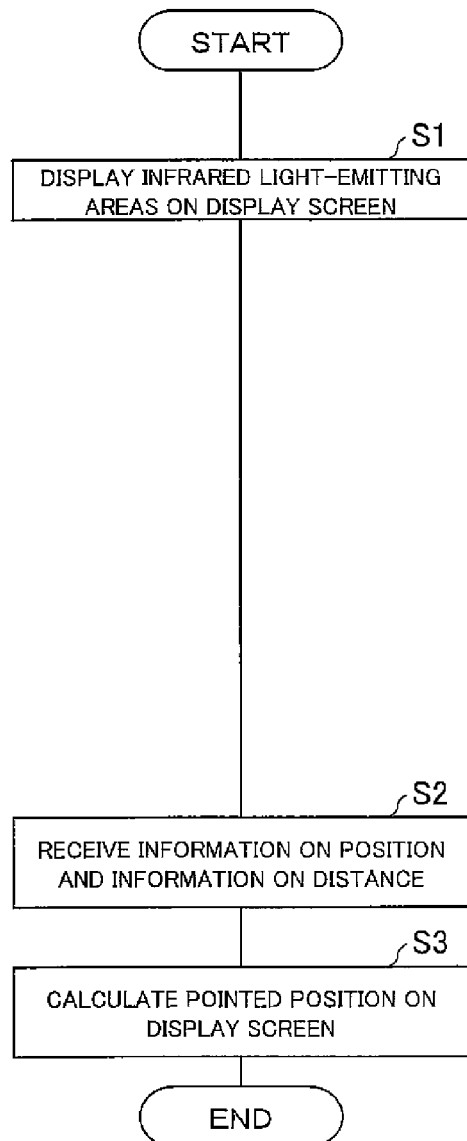
FIG. 6 is a flow chart illustrating a flow of a calculating process of calculating a pointed position, the calculating process of the display system of the one embodiment of the present invention.
Figure 6:
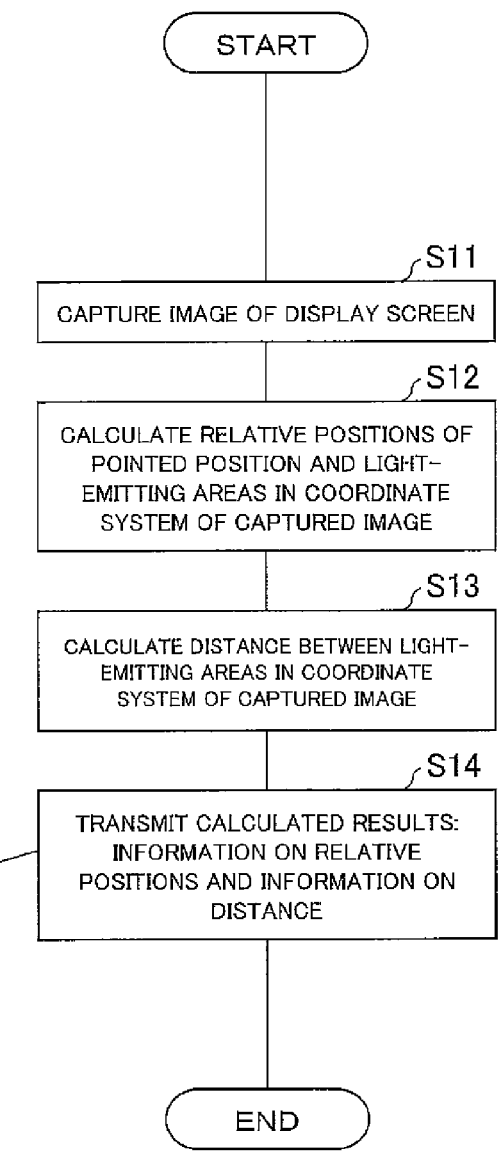

The following description deals with how a position is calculated that is pointed by the operating device 20. FIG. 6 is a flow chart illustrating a process flow of how the pointed position on a display screen that is pointed by the operating device 20 is calculated.

The display controlling section 31 of the liquid crystal display apparatus 10 initially controls the source driver 32 and the gate driver 33 so as to cause two infrared light-emitting areas to displayed in predetermined positions on a display screen (S1). It is also possible to carry out the process only while a user selects a mode for calculating a position pointed by the operating device 20 (a pointed position calculating mode). Alternatively, the process can be carried out at any time.

Then, the controlling section 26 of the operating device 20 causes the image sensing device 23 to capture an image of the display screen (S11). The image sensing device 23 captures an image in the direction in which the head part of the operating device 20 points. The process can be carried out at predetermined time intervals. Alternatively, the process can be carried out continuously. Alternatively, the process can be carried out in response to an instruction entered by a user from the operating switch 25. Alternatively, the process may be carried out continuously or at predetermined time intervals while a predetermined button is pressed down by a user.

Then, the controlling section 26 of the operating device 20 causes the position calculating section 72 of the image processing module 24 to calculate relative positions of the light-emitting areas with respect to a pointed position in the coordinate system of the captured image (in the present embodiment, the center of the captured image) (S12). The relative positions can be determined by calculating relative positions of the light-emitting areas with respect to the pointed position. Alternatively, the relative positions can be determined by calculating relative positions, with respect to the pointed position, of points that are uniquely determined according to the positions of the light-emitting areas (i.e., the midpoint between the light-emitting areas, the centroid of the light-emitting areas, or the like).

The controlling section 26 of the operating device 20 then causes the distance calculating section 73 of the image processing module 24 to calculate a distance between the light-emitting areas in the coordinate system of the captured image (S13).

The controlling section 26 of the operating device 20 then causes the communication module 27 to transmit to the liquid crystal display apparatus 10 (i) information indicative of the relative positions calculated in S12 and (ii) information indicative of the distance between the light-emitting areas calculated in S13 (S14).

The display controlling section 31 of the liquid crystal display apparatus 10 receives the information transmitted from the operating device 20 via the communication module 13 (S2). Based on the information thus received, the display controlling section 31 calculates the position on the display screen that is pointed by the operating device 20 (i.e., calculates the position, in the coordinate system of the display screen, that is pointed by the operating device 20) (S3). Specifically, the information received by the display controlling section 31 from the operating device 20 is information on the positions of the light-emitting areas in the coordinate system of the captured image. As such, the information thus received is converted into information in the coordinate system of the display screen, thereby calculating the position on the display screen that is pointed by the operating device 20.

Figure 7A:
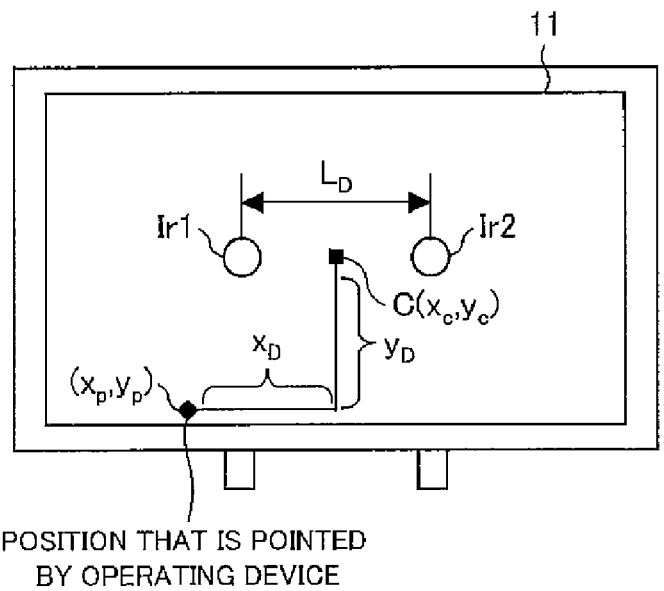
FIG. 7(a) is an explanatory view illustrating one example of infrared light-emitting areas that are displayed on the display section of the display apparatus of the one embodiment of the present invention.
Figure 7B:
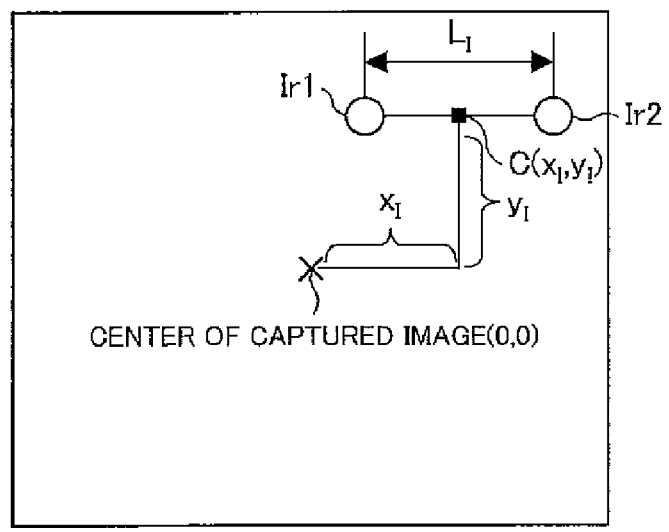
FIG. 7(b) is an explanatory view illustrating one example of a captured image in which the display section illustrated in FIG. 7(a) is captured by an image sensing device provided in the operating device.

The following description deals in more detail with how to calculate the position, in the coordinate system of the display screen, that is pointed by the operating device 20. FIG. 7(a) is an explanatory view illustrating one example of the two light-emitting areas (infrared light-emitting areas) Ir1 and Ir2, which are displayed on the display section 11 of the liquid crystal display apparatus 10. FIG. 7(b) is an explanatory view illustrating one example of a captured image in a case where an image of the display section 11 illustrated in FIG. 7(a) is captured by the image sensing device 23 of the operating device 20.

As illustrated in FIG. 7(b), in the coordinate system of the captured image, coordinates of the center of the captured image is represented by (0, 0); coordinates of a midpoint C between the light-emitting areas Ir1 and Ir2 is represented by $(x_I, y_I)$; the distance between the light-emitting areas Ir1 and Ir2 is represented by $L_I$. As illustrated in FIG. 7(a), a distance between the light-emitting areas Ir1 and Ir2 in the coordinate system of the display screen is represented by $L_D$; coordinates of a midpoint between the light-emitting areas Ir1 and Ir2 are represented by $(x_c, y_c)$; coordinates of a position on the display screen that is pointed by the operating device 20 is represented by $(x_p, y_p)$. $x_D$ represents a distance in an x direction between (i) the position on the display screen that is pointed by the operating device 20, and (ii) the midpoint between the light-emitting areas Ir1 and Ir2. Likewise, $y_D$ represents the distance in a y direction between (i) and (ii).

A coefficient for converting the coordinate system of the captured image into the coordinate system of the display screen is calculated by the equation: $c=L_D/L_I$. Since $x_D$ and $y_D$ can be represented by the equations: $x_D=c \times x_I$; $y_D=c \times y_I$, the coordinates of the pointed position on the display screen (i.e., the coordinates of the pointed position, in the coordinate system of the display screen, that is pointed by the operating device 20) can be identified by the equations: $x_p=xc-x_D=xc-c \times x_I$; $y_p=yc-y_D=yc-c \times y_I$.

As described above, the display system 1 of the present embodiment displays the two infrared light-emitting areas within the display screen of the liquid crystal display apparatus 10. The operating device 20 captures an image of the display screen. Then, the operating device 20 calculates (i) relative positions of the infrared light-emitting areas and a pointed position on the display screen in the coordinate system of the captured image and (ii) a distance between the infrared light-emitting areas in the coordinate system of a captured image. The results thus calculated are transmitted to the liquid crystal display apparatus 10. Then, based on the calculated result received from the operating device 20 and the positions of the light-emitting areas in the coordinate system of the display screen, the liquid crystal display apparatus 10 obtains a position, in the coordinate system of the display screen, that is pointed by the operating device 20.

Since infrared light-emitting areas are thus displayed within a display screen, the infrared light-emitting areas are more likely to be in a range in which an operating device can capture an image even when a distance between the display screen and the operating device is short, as compared with a conventional case where light-emitting areas are provided outside a display screen. This makes it possible to broaden an area on the display screen in which a pointed position on the display screen can be properly calculated. In addition, this makes it possible to easily calculate coordinates of the pointed position in the coordinate system of the display screen based on (i) positions of the light-emitting areas in the coordinate system of the display screen and (ii) relative positions of the light-emitting areas and the pointed position in the coordinate system of a captured image.

In the present embodiment, the image processing module 24 and the controlling section 26 are provided as different functional blocks. However, the image processing module 24 and the controlling section 26 may be realized as a single operation means.

In the present embodiment, the operating device 20 calculates a distance between the light-emitting areas in the coordinate system of a captured image, and relative positions of light-emitting areas with respect to a pointed position in the coordinate system of a captured image (i.e., relative positions of the light-emitting areas and the center of the captured image, or relative positions of (i) a point (e.g., the midpoint between the light-emitting areas) that is uniquely determined in accordance with the positions of the light-emitting areas and (ii) the center of the captured image). However, the present embodiment is not limited to this. For example, it is also possible to adopt an arrangement in which the data of a captured image that is captured by the image sensing device 23 is transmitted to the liquid crystal display apparatus 10 so that the liquid crystal display apparatus 10 calculates (i) relative positions of light-emitting areas with respect to a pointed position in the coordinate system of the captured image and (ii) the distance between the light-emitting areas in the coordinate system of a captured image.

In the present embodiment, the liquid crystal display apparatus 10 calculates a position in the coordinate system of the display screen that is pointed by the operating device 20, based on (i) relative positions of the light-emitting areas with respect to a pointed position in the coordinate system of a captured image and (ii) a distance between the light-emitting areas in the coordinate system of a captured image that (i) and (ii) are calculated by the operating device 20. However, the present embodiment is not limited to this. For example, it is possible to adopt an arrangement in which the distance $L_D$ between the light-emitting areas or the positions (coordinates) of the light-emitting areas in the coordinate system of the display screen is (are) transmitted in advance from the communication module 13 of the liquid crystal display apparatus 10 to the operating device 20, and then the image processing module 24 of the operating device 20 calculates a pointed position in the coordinate system of the display screen based on (i) information received from the liquid crystal display apparatus 10, (ii) relative positions of the light-emitting areas with respect to a pointed position in the coordinate system of a captured image, and (iii) the distance between the light-emitting areas in the coordinate system of a captured image. In this case, the calculated result of the pointed position in the coordinate system of the display screen should be transmitted from the operating device 20 to the liquid crystal display apparatus 10.

The present embodiment has dealt with an arrangement in which the two infrared light-emitting areas are displayed on the display screen. However, the present embodiment is not limited to this. Instead, three or more infrared light-emitting areas can be displayed on the display screen.

Figure 8A:
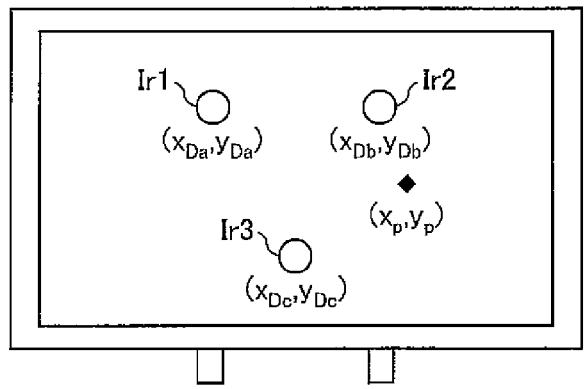
FIG. 8(a) is an explanatory view illustrating another example of infrared light-emitting areas that are displayed on the display section of the display apparatus of the one embodiment of the present invention.
Figure 8B:
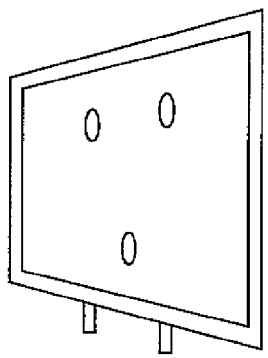
FIG. 8(b) is a view illustrating the display section illustrated in FIG. 8(a), when viewed from an oblique viewing angle.
Figure 8C:
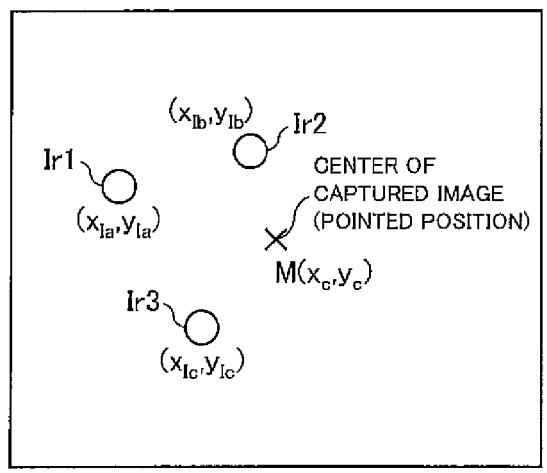
FIG. 8(c) is an explanatory view illustrating one example of a captured image in which the display section illustrated in FIG. 8(a) is captured from an oblique viewing angle illustrated in FIG. 8(b) by an image sensing device provided in the operating device.

The following describes an example of how a pointed position on a display screen is calculated in a case where three infrared light-emitting areas are displayed on the display screen. FIG. 8(a) is an explanatory view illustrating one example in which three light-emitting areas (infrared light-emitting areas) Ir1, Ir2, and Ir3 are displayed on the display section 11 of the liquid crystal display apparatus 10. FIG. 8(c) is an explanatory view illustrating one example of a captured image obtained in a case where the image sensing device 23 of the operating device 20 captures, at an oblique viewing angle as shown in FIG. 8(b), an image of the display section 11 illustrated in FIG. 8(a).

As illustrated in FIG. 8(c), it is assumed that $(x_c, y_c)$ represents coordinates of a pointed position (in this case, the center of a captured image) in the coordinate system of the captured image; $(x_{Ia}, y_{Ia})$, $(x_{Ib}, y_{Ib})$, and $(x_{Ic}, y_{Ic})$ represent coordinates of the light-emitting areas Ir1, Ir2, and Ir3 in the coordinate system of the captured image, respectively. As illustrated in FIG. 8(a), it is assumed that (i) $(x_{Da}, y_{Da})$, $(x_{Db}, y_{Db})$, and $(x_{Dc}, y_{Dc})$ represent coordinates of the light-emitting areas Ir1, Ir2, and Ir3 in the coordinate system of the display screen, respectively and (ii) $(x_p, y_p)$ represents coordinates of a pointed position in the coordinate system of the display screen.

Figure 9A:
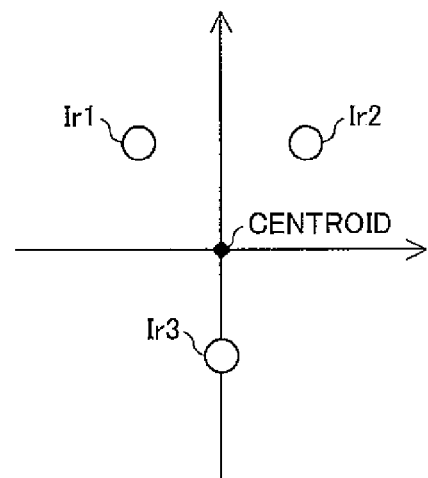
FIG. 9(a) is an explanatory view illustrating a relation between the infrared light-emitting areas displayed on the display section of the display apparatus of the one embodiment of the present invention and a centroid of the infrared light-emitting areas.

First, it is determined how the light-emitting areas in the coordinate system of the captured image is correlated with the light-emitting areas in the coordinate system of the display screen. As illustrated in FIG. 9(a), according to the present embodiment, the light-emitting area Ir1 is in a second quadrant; the light-emitting area Ir2 is in a first quadrant; the light-emitting area Ir3 is on a borderline between a third quadrant and a fourth quadrant (i.e., on a y-axis), where it is assumed that the centroid of the three light-emitting areas coincides with the origin of coordinates (0, 0) in the coordinate system of the display screen.

Figure 9B:
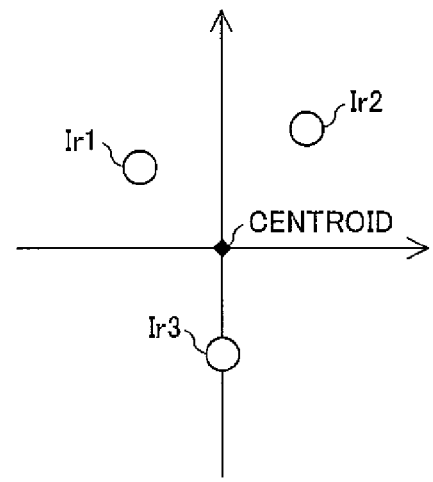
FIG. 9(b) is an explanatory view illustrating a relation between (i) infrared light-emitting areas in that captured image of the display section illustrated in FIG. 9(a) that is captured by the image sensing device provided in the operating device and (ii) a centroid of the infrared light-emitting areas.

As illustrated in FIG. 9(b), similarly, a light-emitting area Ir1 is in a second quadrant; a light-emitting area Ir2 is in a first quadrant; a light-emitting area Ir3 is on a borderline between a third quadrant and a fourth quadrant where it is assumed that the centroid of the three light-emitting areas coincides with the origin point of coordinates (0, 0) in the coordinate system of the captured image.

A matrix D and a matrix I are defined as below.

$$D = \begin{pmatrix} x_{Da} & y_{Da} & 1 \\ x_{Db} & y_{Db} & 1 \\ x_{Dc} & y_{Dc} & 1 \end{pmatrix}$$

$$I = \begin{pmatrix} x_{Ia} & x_{Ib} & x_{Ic} \\ y_{Ia} & y_{Ib} & y_{Ic} \\ 1 & 1 & 1 \end{pmatrix}$$

A determinant M that satisfies the equation D=MI is expressed as: $M=DI^{-1}$. Therefore, a pointed position $(x_p, y_p)$ in the coordinate system of the display screen is calculated by the following determinant.

$$(x_p \quad y_p \quad 1) = M \begin{pmatrix} x_c \\ y_c \\ 1 \end{pmatrix}$$

The calculation may be carried out by the image processing module 24 or the controlling section 26 of the operating device 20, or by the display controlling section 31 of the liquid crystal display apparatus 10.

It is possible to appropriately calculate a position, on the display screen, which is pointed by the operating device 20, by calculating the position based on the three or more infrared light-emitting areas, not only in a case where the display screen is pointed by the operating device 20 from the front side of the display screen, but also in a case where the display screen is pointed by the operating device 20 at an oblique viewing angle, as illustrated in FIG. 9 for example.

[Second Embodiment]

The following describes another embodiment of the present invention. For convenience of explanation, members with the same functions as those of the members described in the first embodiment are given the same reference letters and numerals, and the descriptions for such members are omitted.

Figure 10:
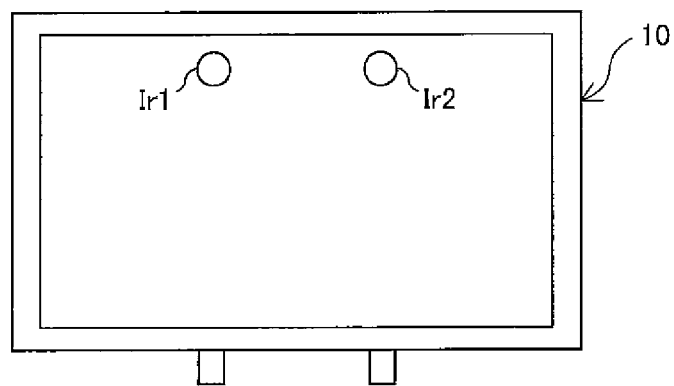
FIG. 10 is an explanatory view illustrating one example of the infrared light-emitting areas that are displayed, in the display system of the one embodiment of the present invention, on the display screen of the display apparatus.
Figure 11:
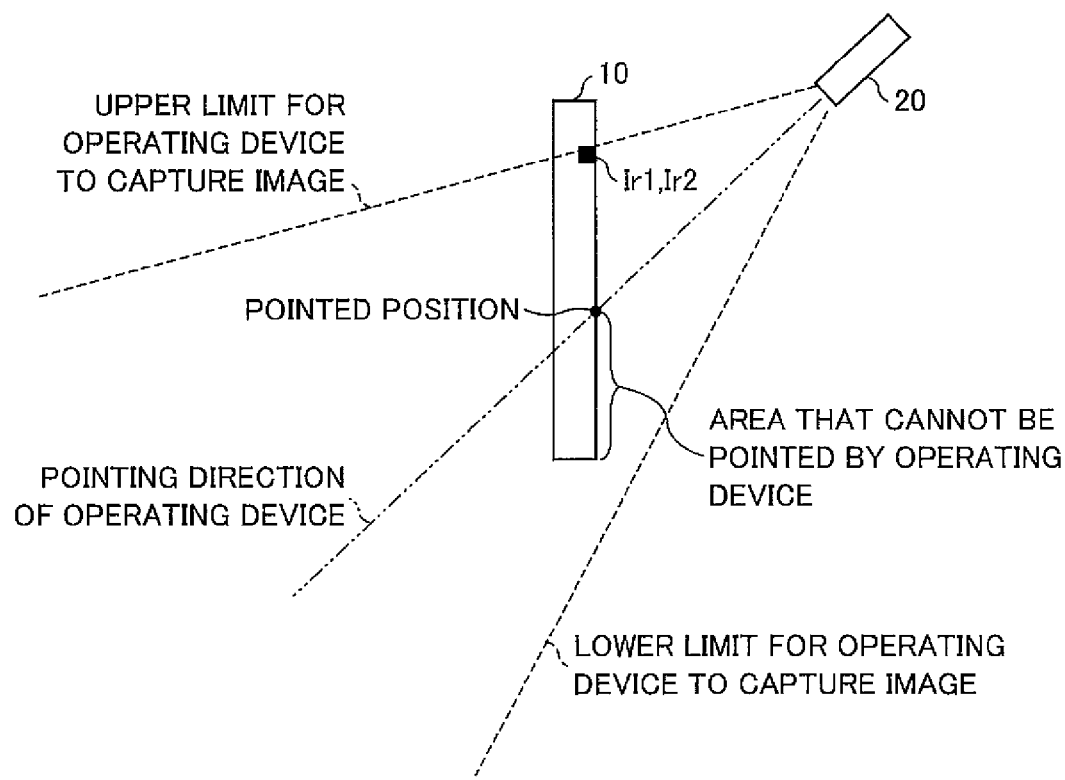
FIG. 11 is an explanatory view illustrating an example of a range in which a position on the display screen can be pointed, in a case where the infrared light-emitting areas are displayed at the position illustrated in FIG. 10, by the operating device that is positioned in the vicinity of the display screen.
Figure 12:
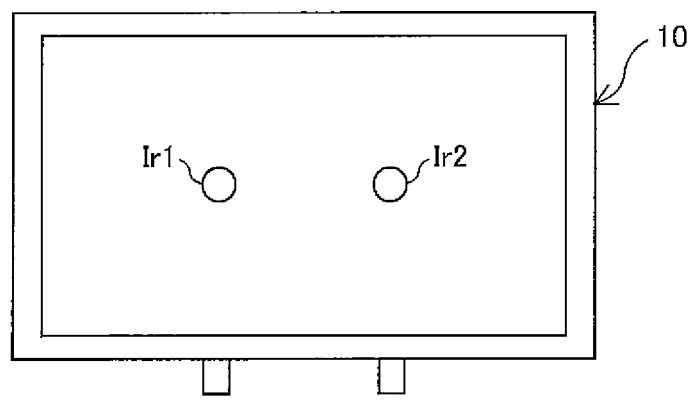
FIG. 12 is an explanatory view illustrating another example of the infrared light-emitting areas that are displayed, in the display system of the one embodiment of the present invention, on the display screen of the display apparatus.
Figure 13:
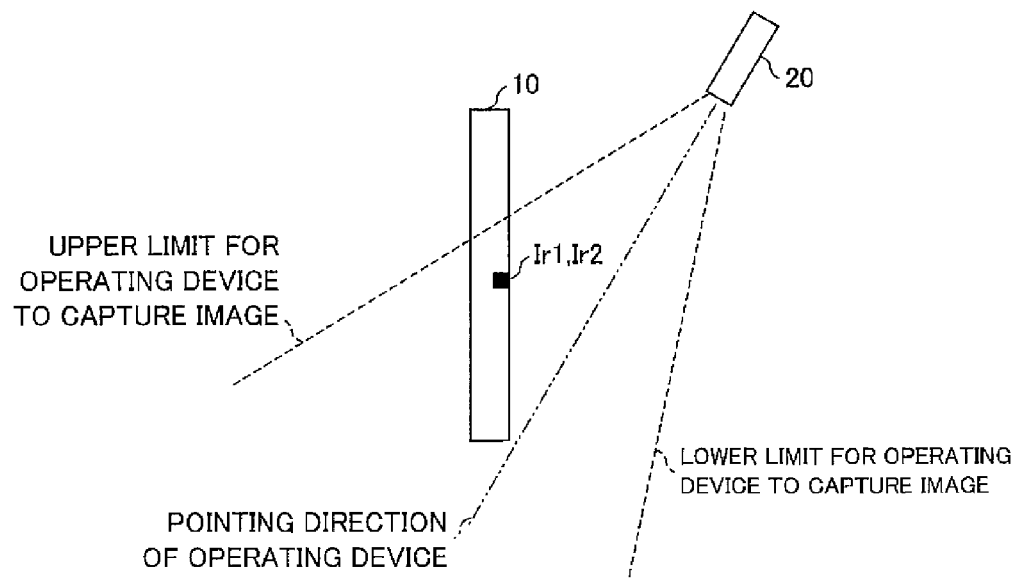
FIGS. 13(a) and 13(b) are explanatory views each illustrating an example of a range in which a position can be pointed, in a case where the infrared light-emitting areas are displayed at the position illustrated in FIG. 12, by the operating device that is positioned in the vicinity of the display screen.
Figure 13:
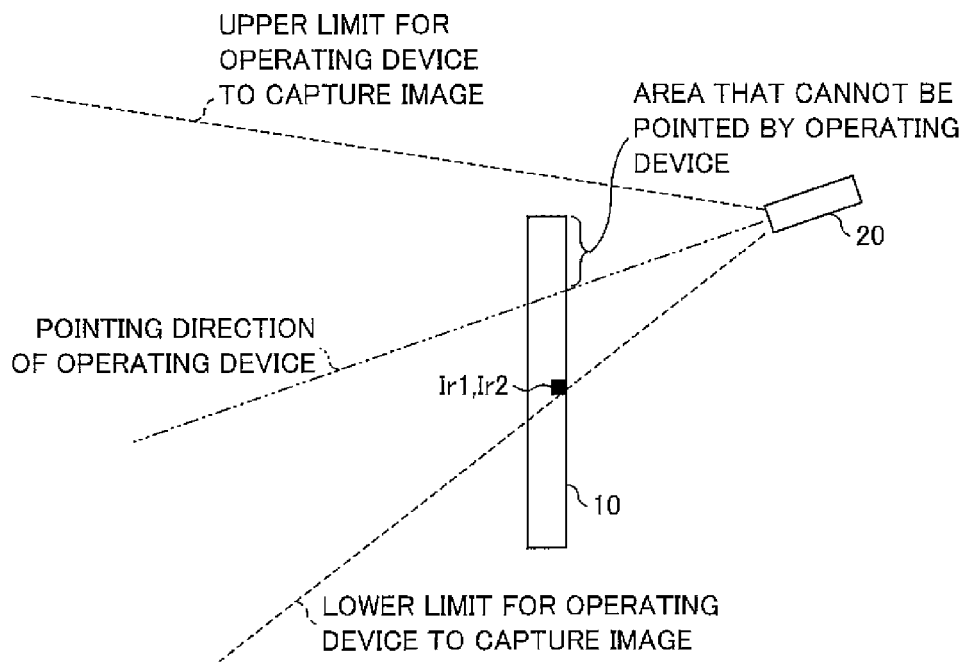

FIG. 10 and FIG. 12 are explanatory views each illustrating an example in which infrared light-emitting areas are displayed on the display screen of the liquid crystal display apparatus 10 of the display system 1 that is illustrated in the first embodiment. FIG. 11 is an explanatory view illustrating an example of a range in which a position can be pointed by the operating device 20 from a position close to the display screen, in a case where the infrared light-emitting areas are displayed at the positions illustrated in FIG. 10. FIG. 13(*a*) and FIG. 13(*b*) are explanatory views each illustrating an example of a range in which a position can be pointed by the operating device 20 from a position close to the display screen, in a case where the infrared light-emitting areas are displayed at the positions illustrated in FIG. 12.

In a case where the infrared light-emitting areas are displayed at the positions illustrated in FIG. 10, as illustrated in FIG. 11, there will occur an area underneath the display screen where the operating device 20 cannot point. Furthermore, in a case where the infrared light-emitting areas are displayed at the position illustrated in FIG. 12 and the operating device 20 points, from diagonally above the display screen, as illustrated in FIG. 13(*a*), the operating device 20 can point the entire of a lower part of the display screen, whereas there will occur an area where the operating device 20 cannot point, as shown in FIG. 13(*b*).

Since, as in the case of the first embodiment, infrared light-emitting areas are displayed within a display screen, the infrared light-emitting areas are more likely to be in a range in which the operating device 20 can capture an image even when a distance between the operating device 20 and the display screen is short. This makes it possible to broaden an area in which a position can be pointed by the operating device 20. However, as described above, there will occur an area where the operating device 20 cannot point, in a case where the distance between the operating device 20 and the display screen is much shorter.

In view of this, according to the second embodiment, a pointed position in the coordinate system of a display screen and a distance between the display screen and the operating device 20 are calculated based on a captured image that is captured by the operating device 20. Based on the calculated results, display positions of the infrared light-emitting areas are controlled so that an area on the display screen that can be pointed by the operating device 20 is further broadened even when the distance between the operating device 20 and the display screen is significantly short.

Figure 14:
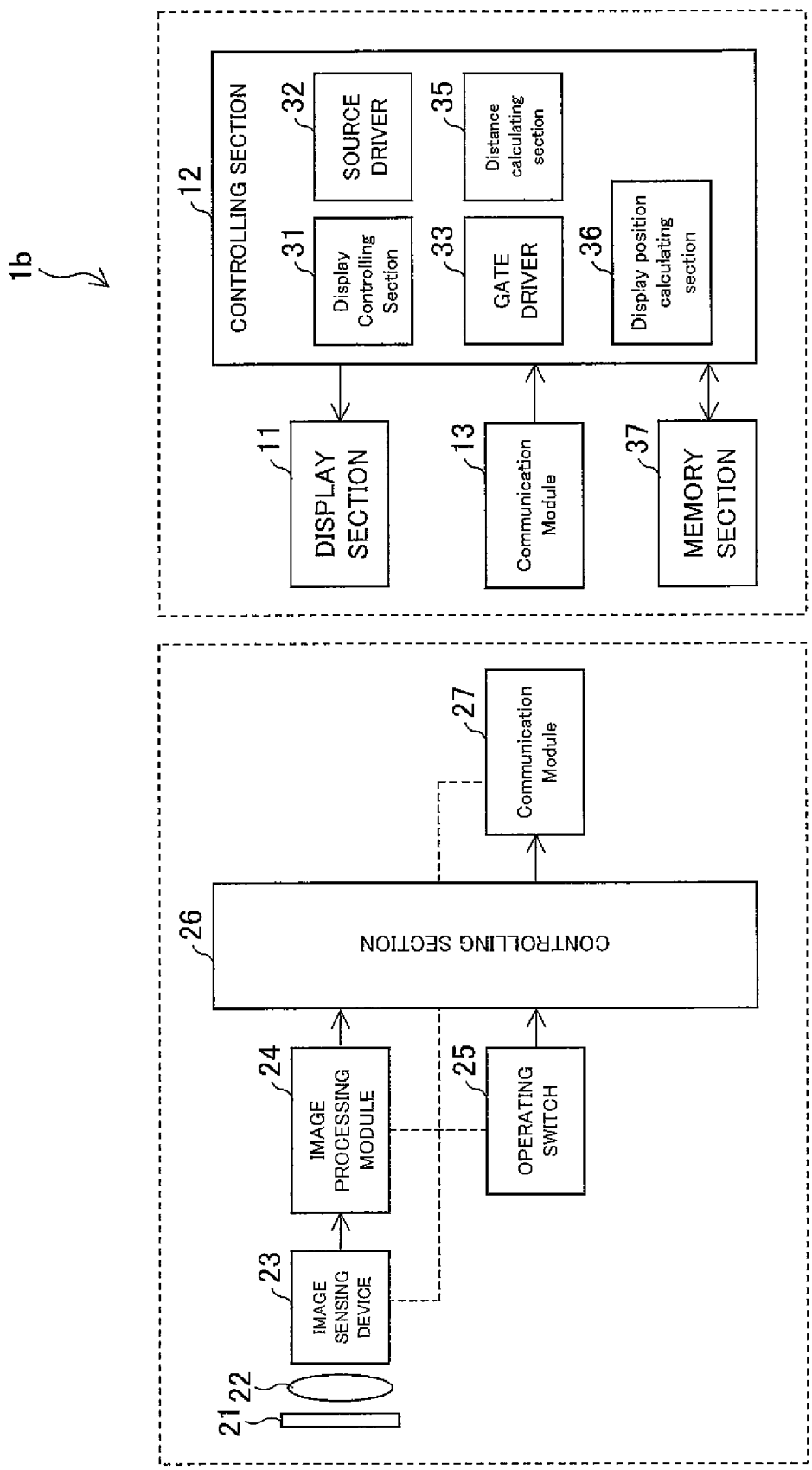
FIG. 14 is a block diagram illustrating a schematic arrangement of a display system of another embodiment of the present invention.

FIG. 14 is a block diagram illustrating a schematic arrangement of a display system 1*b* of the present embodiment. As illustrated in FIG. 14, in the display system 1*b* of the present embodiment, a liquid crystal display apparatus 10 includes a distance calculating section 35, a display position calculating section 36, and a memory section 37, in addition to the arrangement of the display system 1 of the first embodiment. The distance calculating section 35 and the display position calculating section 36 are included in a controlling section 12.

The distance calculating section 35 calculates a distance between light-emitting areas that are being displayed on a display screen.

The display position calculating section 36 calculates altered display positions of the infrared light-emitting areas based on (i) a position in the coordinate system of the display screen, which position is calculated, as the position pointed by the operating device 20, by the display controlling section 31, (ii) a distance, calculated by the distance calculating section 35, between the light-emitting areas that are being displayed on the display screen, and (iii) a distance between light-emitting areas in a captured image that is received from the operating device 20.

As illustrated in FIG. 15, the memory section 37 stores in advance a lookup table in which (i) a distance between the light-emitting areas, which are being displayed, in the coordinate system of the display screen, (ii) a distance between the light-emitting areas in the coordinate system of the captured image, and (iii) an altered (set) distance between the light-emitting areas are correlated with each other. The altered distance, in the lookup table, between the light-emitting areas is set shorter as the distance between the display screen and the operating device 20 becomes shorter.

The display position calculating section 36 refers to the lookup table so as to retrieve an altered distance between the light-emitting areas that corresponds to a distance between the light-emitting areas that are being displayed on the display screen and a distance between the light-emitting areas in a captured image. The display position calculating section 36 then calculates display positions of the light-emitting areas so that the light-emitting areas are displayed, according to the altered and retrieved distance between the light-emitting areas, in the vicinity of the position in the coordinate system of the display screen, which position is calculated, as the position pointed by the operating device 20, by the display controlling section 31 based on the positions of the light-emitting areas that are being displayed on the display screen. More specifically, the display position calculating section 36 calculates display positions of the light-emitting areas so that a midpoint (or the centroid) of the light-emitting areas obtained after the light-emitting areas are altered is positioned at the position that is calculated, as the position pointed by the operating device 20, based on the light-emitting areas that are displayed on the display device before the change of the display position. The positions of the light-emitting areas to be displayed on the display screen are altered to the display positions thus calculated.

Figure 16A:
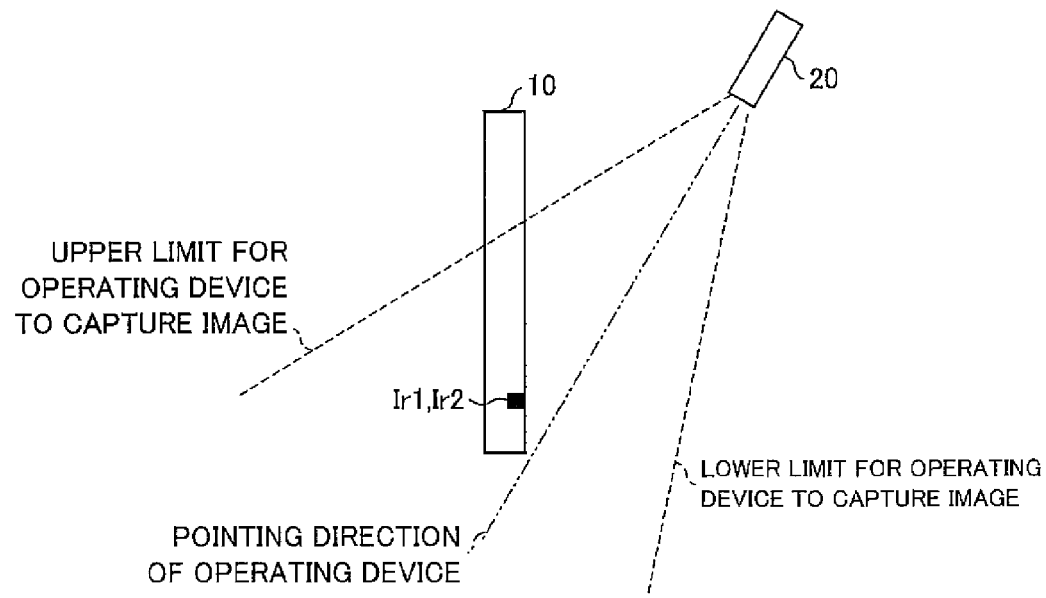
FIGS. 16(a) and 16(b) are explanatory views each illustrating a relation between a pointed position that is by an operating device and that display position on a display screen in which light-emitting areas are displayed, the relation in the display system of the another embodiment of the present invention.
Figure 16B:
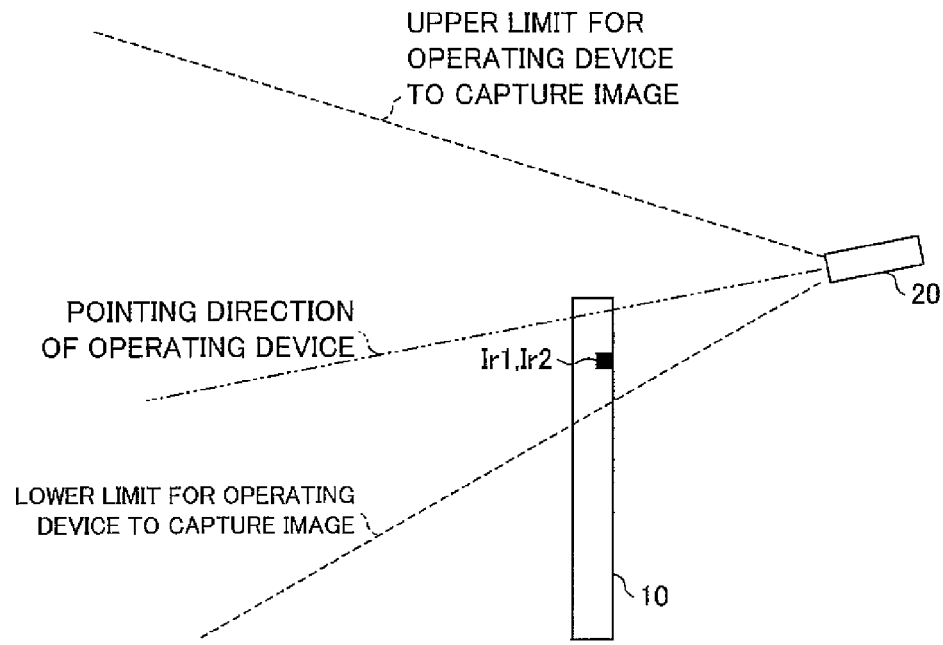

According to the display system 1*b* of the present embodiment, a position pointed by the operating device 20 is calculated, based on the positions of the light-emitting areas that are being displayed on the display screen, and the display positions of the light-emitting areas are altered to an area in the vicinity of the position thus calculated. This causes, as illustrated in FIG. 16(*a*) and FIG. 16(*b*), the infrared light-emitting areas to be always displayed in the vicinity of the position that is pointed by the operating device 20. As such, it is possible to prevent a failure in detection of a position pointed by the operating device 20 for the reason that the light-emitting areas on the display screen are not within a range in which the operating device 20 can capture an image in a case where the position that is pointed by the operating device 20 is changed from one to another.

Figure 17:
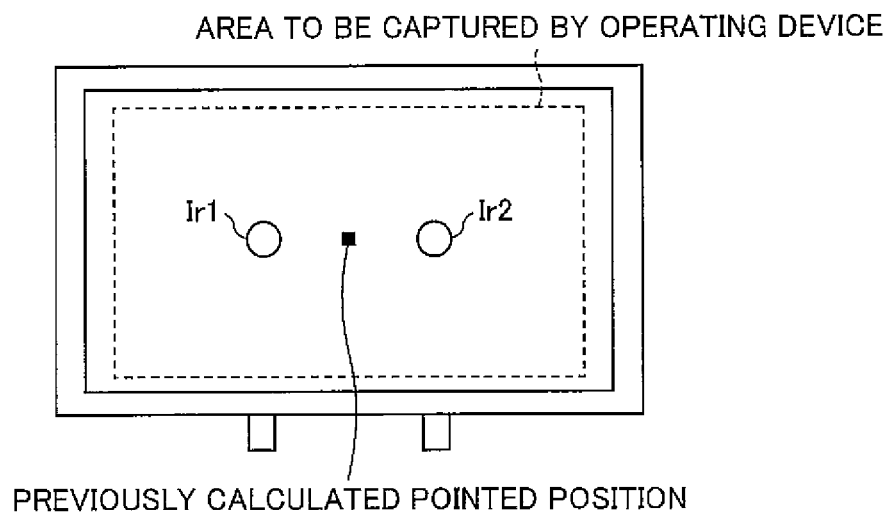
FIG. 17(a) is an explanatory view illustrating an example of an altered display position of the light-emitting areas in a case where the distance between the display screen of the display apparatus and the operating device is long in the display system of the another embodiment of the present invention.
FIG. 17(b) is an explanatory view illustrating an example of an altered display position of the light-emitting areas in a case where the distance between the display screen of the display apparatus and the operating device is short in the display system of the another embodiment of the present invention.
Figure 17:
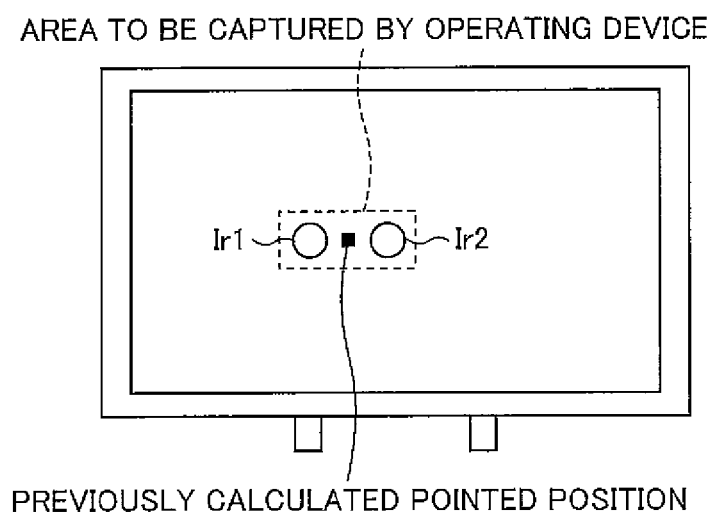
Figure 18A:
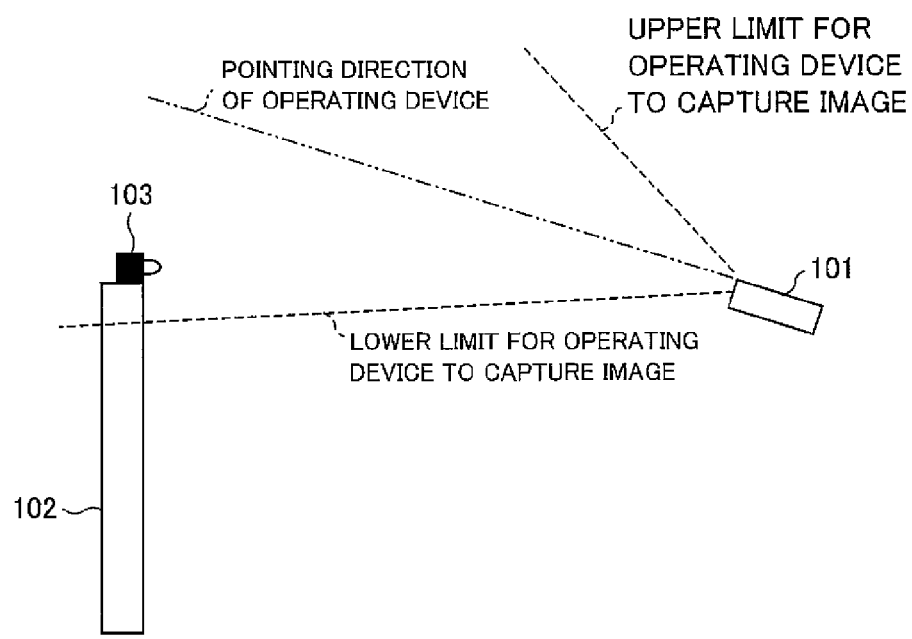
FIGS. 18(a) and 18(b) are explanatory views each illustrating a relation between (i) the distance between an operating device and a display apparatus, and (ii) a range in which a position that is pointed by the operating device can be detected, the relation in a display system according to a conventional art.
Figure 18B:
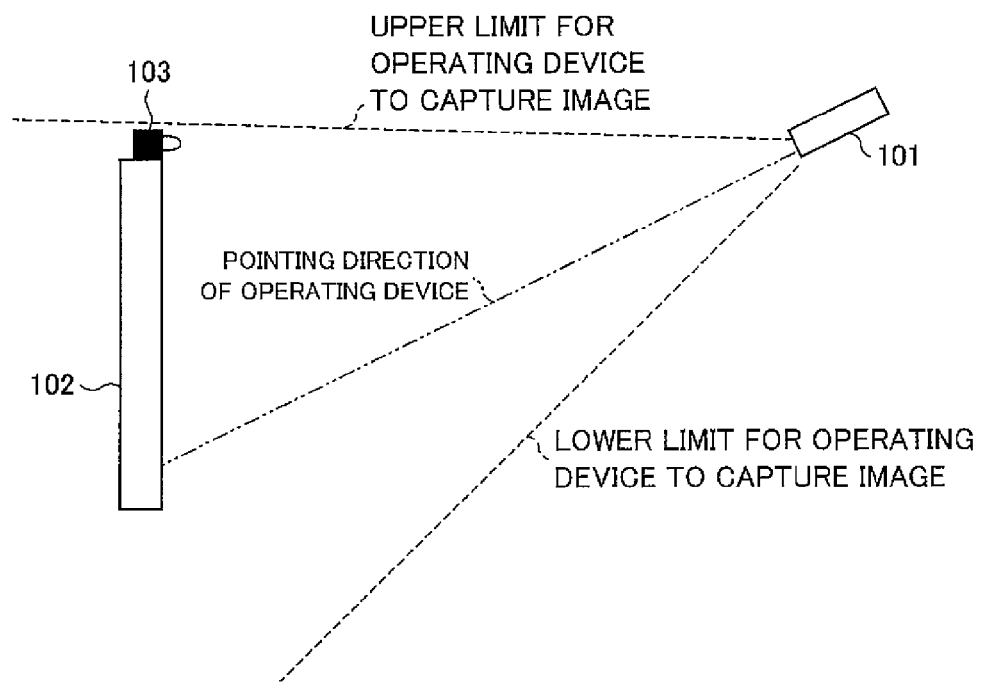
Figure 19:
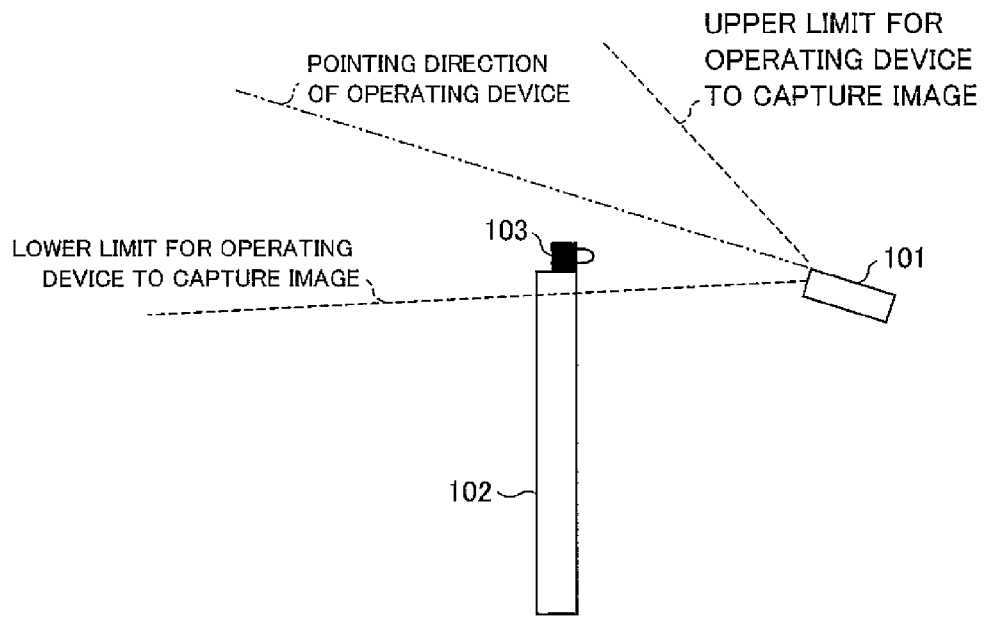
FIGS. 19(a) and 19(b) are explanatory views each illustrating a relation between (i) the distance between the operating device and the display apparatus, and (ii) a range in which a position that is pointed by the operating device can be detected, the relation in the display system according to the conventional art.
Figure 19:
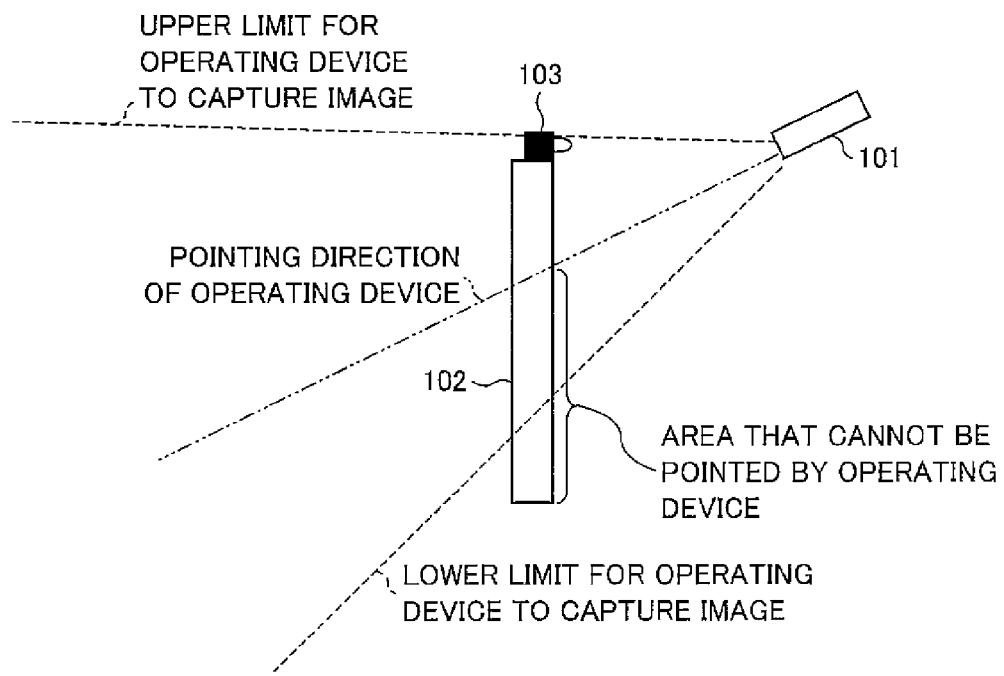

In the present embodiment, the display positions of the light-emitting areas are controlled so that the distance between the light-emitting areas becomes shorter as the distance between the display screen and the operating device 20 becomes shorter. As such, as illustrated in FIG. 17(*a*) and FIG. 17(*b*), it is possible to display the light-emitting areas in the range in which the operating device can capture an image. As a result, it is possible to appropriately calculate the position pointed by the operating device 20 independently of the distance between the display screen and the operating device 20. FIG. 17(*a*) is an explanatory view illustrating an example of altered display positions of the light-emitting areas in a case where the distance between the display screen and the operating device 20 is long. FIG. 17(*b*) is an explanatory view illustrating an example of altered display positions of the light-emitting areas in a case where the distance between the display screen and the operating device 20 is short.

The present embodiment deals with an arrangement in which the lookup table in the memory section 37 is referred to when an altered distance is calculated between the light-emitting areas. However, the present embodiment is not limited to the arrangement. The arrangement can be replaced with the following arrangement, for example. Specifically, the memory section 37 stores a function that correlates (i) a distance between light-emitting areas, being displayed on a display screen, in the coordinate system of the display screen, (ii) a distance between the light-emitting areas in the coordinate system of a captured image, and (iii) an altered (set) distance between the light-emitting areas. And, an altered distance between the light-emitting areas is calculated by the function.

In the aforementioned embodiments, (i) the display controlling section 31 in the liquid crystal display apparatus 10, and (ii) the image processing module 24 and the controlling section 26, in the operating device 20 are realized by software with the use of a processor such as a CPU. Specifically, the display controlling section 31, the image processing module 24, and the controlling section 26 each include a CPU (central processing unit) and memory devices (memory media). The CPU (central processing unit) executes instructions in control programs for realizing required functions of each of the display controlling section 31, the image processing module 24, and the controlling section 26. The memory devices include a ROM (read only memory) in the programs are stored, a RAM (random access memory) to which the programs are loaded, and a memory in which the programs and various data are stored. The objective of the present invention can be achieved (i) by mounting to the liquid crystal display apparatus 10 or the operating device 20 a computer-readable storage medium in which control program code (executable program, intermediate code program, or source program) is stored for the liquid crystal display apparatus 10 or the operating device 20, which control program is software realizing the aforementioned functions, and (ii) by read-out and execution of the program code in the storage medium carried out by the computer (or CPU, MPU).

The storage medium can be, for example, a tape medium such as a magnetic tape or a cassette tape; a disk medium including (i) a magnetic disk such as a floppy (Registered Trademark) disk or a hard disk and (ii) an optical disk such as CD-ROM/MO/MD/DVD/CD-R; a card medium such as an IC card (memory card) or an optical card; or a semiconductor memory medium such as a mask ROM/EPROM/EEPROM/ flash ROM.

The liquid crystal display apparatus 10 and/or the operating device 20 may be arranged to be connectable to a communications network so that the program code can be delivered over the communications network. The communications network is not limited to any particular one, and therefore may be, for example, the Internet, an intranet, extranet, LAN, ISDN, VAN, CATV communications network, virtual dedicated network (virtual private network), telephone line network, mobile communications network, or satellite communications network. The transfer medium which makes up the communications network is not limited to any particular one, and therefore may be, for example, wired line such as IEEE 1394, USB, electric power line, cable TV line, telephone line, or ADSL line; or wireless such as infrared radiation (IrDA, remote control), Bluetooth®, 802.11 wireless, HDR, mobile telephone network, satellite line, or terrestrial digital network. The present invention can be realized in a form of a computer data signal which is incorporated into a carrier wave and in which the program code is embodied by electronic transmission.

The functional blocks of the liquid crystal display apparatus 10 and the operating device 20 can be realized by use of software, but not limited to this. The functional blocks can also be realized by use of hardware. Alternatively, the functional blocks can be realized by a combination of hardware that executes part of processes and computing means for executing software that controls the hardware, and for executing residual ones of the processes.

The embodiments deal with a case where the present invention is applied to a liquid crystal display apparatus. However, the present invention is not limitedly applied to the liquid crystal display apparatus, and therefore is applicable to any display apparatus that allows a predetermined pixel within the display screen to function as an infrared light-emitting area. The present invention is applicable to, for example, a plasma display, an organic EL display, a field emission display, or a rear projector.

The aforementioned embodiments dealt with an arrangement in which a predetermined pixel (or a group of pixels) within a display screen emits light having a wavelength in the infrared region and the pixel (or the group of pixels) functions as an infrared light-emitting area. However, the present embodiments are not limited to the arrangement. For example, it is also possible to separately provide (i) a display panel for displaying an image in accordance with image data and (ii) infrared luminescence means, such as an LED, which functions as an infrared light-emitting area within a display screen of the display panel. In this case, for example, the infrared luminescence means can be provided on a surface of the display panel. Alternatively, the infrared luminescence means can be provided so that light having a wavelength in the infrared region is emitted via a notch section of the display panel.

In the aforementioned embodiments, all the infrared light-emitting areas are provided within the display screen. However, the present embodiments are not limited to the arrangement. It is sufficient to provide at least one infrared light-emitting area within a display screen. Alternatively, it is also possible to adopt an arrangement in which an infrared light-emitting area is provided outside a display screen and at least one infrared light-emitting area is displayed within the display screen so that a pointed position on the display screen is calculated based on the infrared light-emitting areas.

A display system of the present invention comprises: a display apparatus including a display screen on which an image is displayed in accordance with image data; an operating device for pointing, not in contact with the display screen, a position on the display screen, and for capturing an image including the position pointed; and at least two infrared light-emitting areas, in the display apparatus, for emitting light having a wavelength in an infrared region, said system detecting, based on positions of said at least two infrared light-emitting areas included in an image that is captured by the operating device, the position on the display screen pointed by the operating device, and at least one of said at least two infrared light-emitting areas being provided within the display screen of the display apparatus.

According to the arrangement, at least one infrared light-emitting area for emitting light having a wavelength in the infrared region is provided within a display screen. As compared with an arrangement in which an infrared light-emitting area is provided as conventionally only outside a display screen, this arrangement allows a reduction in a distance between a display apparatus and an operating device that distance is required for including in a range in which an image can be captured the two or more infrared light-emitting areas. Accordingly, this allows a reduction in a distance between the display screen and the operating device that distance is required for properly calculating a position, on the display screen, pointed by the operating device. As a result, the position, on the display screen, pointed by the operating device can be properly detected even in a case where the distance between the operating device and the display apparatus is short.

An arrangement of the display apparatus may be such that: the display screen is a display panel including many pixels that are regularly arranged; each of said many pixels includes a plurality of sub-pixels each emitting light having a different wavelength region; at least one of the sub-pixels of at least part of said many pixels are infrared sub-pixels each emitting light having a wavelength in the infrared region; and at least part of the infrared sub-pixels function as the infrared light-emitting areas.

The arrangement allows an infrared sub-pixel of a display panel to function as an infrared light-emitting area. This accordingly eliminates the need for separately providing a display panel and a light source which is used as an infrared light-emitting area. As a result, this prevents an increase of size of the display apparatus and reduces the number of parts, as compared with a case where the display panel and the light source are separately provided. In addition, the arrangement allows sub-pixels except the infrared sub-pixels in each of the pixels to display an image according to image data. As a result, this minimizes a decrease in resolution that is caused by the provision of the infrared light-emitting area.

The display apparatus may further include a display controlling section for controlling an intensity of light emitted from each of said plurality of sub-pixels, the display controlling section controlling an intensity of light emitted from each of the infrared sub-pixels so that the infrared light-emitting areas are displayed in an arbitrary area on the display screen.

According to the arrangement, infrared light-emitting areas can be displayed at desired positions within a display screen. As a result, this makes it possible to control according to, for example, a relative position of an operating device and a display screen the positions of the infrared light-emitting areas.

The display apparatus may be arranged such that: the display panel is a transmissive liquid crystal display panel; a backlight, for emitting light having a spectral distribution in the infrared region, is provided on a side opposite to an image display side of the liquid crystal display panel; and a color filter layer is provided in the liquid crystal display panel, the color filter layer allowing, in an area corresponding to said plurality of sub-pixels, light having wavelength regions corresponding to the sub-pixels to pass through.

According to the arrangement, light in the infrared region that light is emitted from a backlight passes through an infrared sub-pixel. This allows the infrared sub-pixel to function as an infrared light-emitting area.

The display apparatus may further include: a receiving section for receiving from the operating device (i) data of the image that is captured or (ii) data indicative of a relative position of the infrared light-emitting areas in the captured image and the position in the captured image pointed by the operating device, the relative position is calculated by the operating device based on the captured image; and a pointed position calculating section for calculating, based on the data received from the operating device, the position on the display screen pointed by the operating device.

According to the arrangement, a display apparatus can receive by the receiving section data indicative of a captured image that is captured by the image capturing means provided in the operating device or data indicative of a relative position, which is calculated based on the captured image, of a pointed position and the infrared light-emitting areas in the captured image. Then, the display apparatus can calculate the pointed position on the display screen based on the received data.

The display apparatus may further includes: a transmitting section for transmitting to the operating device data indicative of the positions of said at least two infrared light-emitting areas on the display screen; and a receiving section for receiving from the operating device data indicative of the position on the display screen pointed by the operating device, the position is calculated by the operating device based on the data transmitted from the transmitting section.

According the arrangement, the transmitting section transmits data indicative of the positions of the infrared light-emitting areas to the operating device. Accordingly, the operating device can determine a pointed position on a display screen based on an actual positions of the infrared light-emitting areas, positions of the infrared light-emitting areas in a captured image, and a pointed position in the captured image. Then, the display apparatus can obtain the pointed position on the display screen by receiving from the operating device by the receiving section data indicative of the pointed position on the display screen.

The display apparatus may be arranged such that: the display screen is a display panel including many pixels that are regularly arranged; each of said many pixels includes a plurality of sub-pixels each emitting light having a different wavelength region; at least one of the sub-pixels of at least part of said many pixels are infrared sub-pixels each emitting light having a wavelength in the infrared region; said display apparatus, further includes: a display controlling section for controlling an intensity of light emitted from said plurality of sub-pixels so that said at least two infrared light-emitting areas are displayed in respective predetermined positions on the display screen, said display controlling section altering, based on the position calculated by the pointed position calculating section, the display positions of said at least two infrared light-emitting areas so that the display positions are closer to the pointed position than last pointed positions.

According to the arrangement, based on a calculated result of a pointed position on a display screen, the display controlling section alters the display positions of the infrared light-emitting areas so that the display positions are closer to the pointed position. Since the infrared light-emitting areas can be displayed in the vicinity of the pointed position, the infrared light-emitting areas are more likely to be in a captured image even in a case where a distance between the operating device and the display screen is short. As a result, the pointed position on the display screen can be calculated more appropriately.

The display apparatus may be arranged such that: the display controlling section causes said at least two infrared light-emitting areas to be displayed on the display screen, and alters, in accordance with a relation between (i) distances between the infrared light-emitting areas on the display screen and (ii) distances between the infrared light-emitting areas in the image that is captured, the display positions of the infrared light-emitting areas so that the infrared light-emitting areas are within a range in which the image can be captured by the operating device. For example, the display positions of the infrared light-emitting areas are so altered that a distance between the infrared light-emitting areas becomes shorter as a distance between the operating device and the display apparatus becomes shorter.

According to the arrangement, since the infrared light-emitting areas are more likely to be in a captured image even in a case where a distance between the operating device and the display screen is short. As a result, a pointed position on the display screen can be calculated more appropriately.

The display apparatus may further include: a pointed position displaying section for displaying a predetermined image at a position on the display screen corresponding to the position pointed on the display screen by the operating device.

According to the arrangement, displaying a predetermined image at a position corresponding to a pointed position on a display screen allows a viewer of the display screen to recognize the pointed position that is pointed by the operating device.

The display apparatus may be arranged such that said at least two infrared light-emitting areas are three or more infrared light-emitting areas.

According to the arrangement, a pointed position on a display screen is calculated based on the positions of the three or more infrared light-emitting areas that are not aligned on a straight line. This makes it possible to calculate with high precision the pointed position on the display screen even in a case where the display screen is pointed by the operating device at an oblique viewing angle with respect to the display screen.

In order to attain the object of the present invention, a method, of the present invention, for detecting a pointed position in a display system, said display system comprising: a display apparatus including a display screen on which an image is displayed in accordance with image data; an operating device for pointing, not in contact with the display screen, a position on the display screen, and for capturing an image including the position pointed; and at least two infrared light-emitting areas, in the display apparatus, for emitting light having a wavelength in an infrared region, said system detecting, based on positions of said at least two infrared light-emitting areas included in an image that is captured by the operating device, the position on the display screen pointed by the operating device, said method includes the step of: providing at least one of said at least two infrared light-emitting areas within the display screen of the display apparatus.

According to the method, at least one infrared light-emitting area for emitting light having a wavelength in the infrared region is provided within a display screen. As compared with an case where an infrared light-emitting area is provided as conventionally only outside a display screen, this arrangement allows a reduction in a distance between a display apparatus and an operating device that distance is required for including in a range in which an image can be captured the two or more infrared light-emitting areas. Accordingly, this allows a reduction in a distance between the display screen and the operating device that distance is required for properly calculating a position, on the display screen, pointed by the operating device. As a result, the position, on the display screen, pointed by the operating device can be properly detected even in a case where the distance between the operating device and the display apparatus is short.

The display apparatus may be realized as a computer. In this case, the present invention encompasses (i) a program for causing the computer to function as the display controlling section, thereby realizing the display apparatus by the computer, and (ii) a computer-readable recording medium storing the program.

The present invention is applicable to a display apparatus and to a display system including an operating device for pointing in a noncontact manner a desired position on a display screen of the display apparatus. For example, the present invention is applicable to a pointing device by which an image for a conference, a presentation, a game, or the like is displayed on a display screen of a display apparatus, and a desired position on the display screen is pointed by use of an operating device.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. A display system comprising:
   a display apparatus including a display screen on which a visible image is displayed in accordance with image data;
   an operating device for pointing, not in contact with the display screen, a position on the display screen, and for capturing an image including the position pointed; and
   at least two infrared light-emitting areas, in the display apparatus, for emitting light having a wavelength in an infrared region,
   said operating device capturing an image of the display apparatus displaying the visible image on the display screen in accordance with the image data, and thereby obtaining an image which includes at least an infrared image,
   said system detecting, based on positions of said at least two infrared light-emitting areas included in the image that is captured by the operating device, the position on the display screen pointed by the operating device, and
   at least one of said at least two infrared light-emitting areas being provided within the display screen of the display apparatus.

2. The display system as set forth in claim 1, wherein:
   the display screen is a display panel including many pixels that are regularly arranged;
   each of said many pixels includes a plurality of sub-pixels each emitting light having a different wavelength region;
   at least one of the sub-pixels of at least part of said many pixels are infrared sub-pixels each emitting light having a wavelength in the infrared region; and
   at least part of the infrared sub-pixels function as the infrared light-emitting areas.

3. The display system as set forth in claim 2, further comprising a display controlling section for controlling an intensity of light emitted from each of said plurality of sub-pixels,
   the display controlling section controlling an intensity of light emitted from each of the infrared sub-pixels so that the infrared light-emitting areas are displayed in an arbitrary area on the display screen.

4. The display system as set forth in claim 2, wherein:
   the display panel is a transmissive liquid crystal display panel;

a backlight, for emitting light having a spectral distribution in the infrared region, is provided on a side opposite to an image display side of the liquid crystal display panel; and a color filter layer is provided in the liquid crystal display panel, the color filter layer allowing, in an area corresponding to said plurality of sub-pixels, light having wavelength regions corresponding to the sub-pixels to pass through.

5. The display system as set forth in claim 1, further comprising:

a receiving section for receiving from the operating device (i) data of the image that is captured or (ii) data indicative of a relative position of the infrared light-emitting areas in the captured image and the position in the captured image pointed by the operating device, the relative position is calculated by the operating device based on the captured image; and a pointed position calculating section for calculating, based on the data received from the operating device, the position on the display screen pointed by the operating device.

6. The display system as set forth in claim 5, wherein:

the display screen is a display panel including many pixels that are regularly arranged;

each of said many pixels includes a plurality of sub-pixels each emitting light having a different wavelength region;

at least one of the sub-pixels of at least part of said many pixels are infrared sub-pixels each emitting light having a wavelength in the infrared region;

said system, further comprising:

a display controlling section for controlling an intensity of light emitted from said plurality of sub-pixels so that said at least two infrared light-emitting areas are displayed in respective predetermined positions on the display screen, said display controlling section altering, based on the position calculated by the pointed position calculating section, the display positions of said at least two infrared light-emitting areas so that the display positions are closer to the pointed position than last display positions.

7. The display system as set forth in claim 6, wherein the display controlling section causes said at least two infrared light-emitting areas to he displayed on the display screen, and alters, in accordance with a relation between (i) distances between the infrared light-emitting areas on the display screen and (ii) distances between the infrared light-emitting areas in the image that is captured, the display positions of the infrared light-emitting areas so that the infrared light-emitting areas are within a range in which the image can be captured by the operating device.

8. The display system as set forth in claim 1, further comprising:

a transmitting section for transmitting to the operating device data indicative of the positions of said at least two infrared light-emitting areas on the display screen; and a receiving section for receiving from the operating device data indicative of the position on the display screen pointed by the operating device, the position is calculated by the operating device based on the data transmitted from the transmitting section.

9. The display system as set forth in claim 8, wherein:

the display screen is a display panel including many pixels that are regularly arranged;

each of said many pixels includes a plurality of sub-pixels each emitting light having a different wavelength region;

at least one of the sub-pixels of at least part of said many pixels are infrared sub-pixels each emitting light having a wavelength in the infrared region;

said system, further comprising:

a display controlling section for controlling an intensity of light emitted from said plurality of sub-pixels so that said at least two infrared light-emitting areas are displayed in respective predetermined positions on the display screen, said display controlling section altering, based on the position calculated by the pointed position calculating section, the display positions of said at least two infrared light-emitting areas so that the display positions are closer to the pointed position than last display positions.

10. The display system as set forth in claim 9, wherein the display controlling section causes said at least two infrared light-emitting areas to be displayed on the display screen, and alters, in accordance with a relation between (i) distances between the infrared light-emitting areas on the display screen and (ii) distances between the infrared light-emitting areas in the image that is captured, the display positions of the infrared light-emitting areas so that the infrared light-emitting areas are within a range in which the image can be captured by the operating device.

11. The display system as set forth in claim 1, further comprising:

a pointed position displaying section for displaying a predetermined image at a position on the display screen corresponding to the position pointed on the display screen by the operating device.

12. The display system as set forth in claim 1, wherein said at least two infrared light-emitting areas are three or more infrared light-emitting areas.

13. A method for detecting a pointed position in a display system, said display system comprising:

a display apparatus including a display screen on which a visible image is displayed in accordance with image data;

an operating device for pointing, not in contact with the display screen, a position on the display screen, and for capturing an image including the position pointed; and at least two infrared light-emitting areas, in the display apparatus, for emitting light having a wavelength in an infrared region, said operating device capturing an image of the display apparatus displaying the visible image on the display screen in accordance with the image data, and thereby obtaining a captured image which includes at least an infrared image, said system detecting, based on positions of said at least two infrared light-emitting areas included in the image that is captured by the operating device, the position on the display screen pointed by the operating device, said method comprising the step of:

providing at least one of said at least two infrared light-emitting areas within the display screen of the display apparatus.

14. A non-transitory computer-readable recording medium storing a program for causing a display apparatus of a display system to operate, and for a computer to function as a display controlling section, said display system comprising:

the display apparatus including a display screen on which a visible image is displayed in accordance with image data;

an operating device for pointing, not in contact with the display screen, a position on the display screen, and for capturing an image including the position pointed; and
at least two infrared light-emitting areas, in the display apparatus, for emitting light having a wavelength in an infrared region,
said operating device capturing an image of the display apparatus displaying the visible image on the display screen in accordance with the image data, and thereby obtaining a captured image which includes at least an infrared image,
at least one of said at least two infrared light-emitting areas being provided within the display screen of the display apparatus,
the display screen being a display panel including many pixels that are regularly arranged,
each of said many pixels including a plurality of sub-pixels each emitting light having a different wavelength,
at least one of the sub-pixels of at least part of said many pixels being infrared sub-pixels each emitting light having a wavelength in the infrared region,
said system further comprising:
said display controlling section for controlling an intensity of light emitted from each of the infrared sub-pixels so that the infrared light-emitting areas are displayed in an arbitrary area on the display screen,
said system detecting, based on positions of said at least two infrared light-emitting areas included in the image that is captured by the operating device, the position on the display screen pointed by the operating device.

* * * * *